United States Patent [19]

Dewey et al.

[11] 4,246,239

[45] Jan. 20, 1981

[54] ALUMINA PRODUCTION BY NITRIC ACID EXTRACTION OF CLAY

[75] Inventors: John L. Dewey; Charles E. Scott, both of Little Rock; James F. Kane; Claud L. Stratton, both of Benton; John C. Rushing, Little Rock; Robert H. Spoonts, Benton, all of Ark.

[73] Assignee: Reynolds Metals Company, Richmond, Va.

[21] Appl. No.: 61,295

[22] Filed: Jul. 27, 1979

[51] Int. Cl.$^3$ .............................................. C01F 7/24
[52] U.S. Cl. .................................. 423/125; 423/132; 423/DIG. 16
[58] Field of Search ................. 423/DIG. 16, 125, 132

[56] References Cited

U.S. PATENT DOCUMENTS

| | | | |
|---|---|---|---|
| 1,413,754 | 4/1922 | Mydell | 423/626 |
| 1,421,804 | 7/1922 | Mydell | 423/122 |
| 1,444,160 | 2/1923 | Mydell | 423/122 |
| 1,792,410 | 2/1931 | Buchner | 423/123 |
| 2,019,554 | 11/1935 | Derr | 423/125 |
| 2,127,504 | 8/1938 | Derr et al. | 423/125 |
| 3,240,561 | 3/1966 | Brown et al. | 423/132 |
| 3,240,562 | 3/1966 | Brown et al. | 423/132 |
| 3,383,166 | 5/1968 | Gerry et al. | 423/132 |
| 3,415,618 | 12/1968 | Yodis et al. | 423/125 |
| 3,804,598 | 4/1974 | Royce et al. | 423/125 |
| 3,869,543 | 3/1975 | Schutte et al. | 423/631 |
| 3,925,538 | 12/1975 | Bruen et al. | 423/631 |

FOREIGN PATENT DOCUMENTS

| | | | |
|---|---|---|---|
| 44-21848 | 9/1969 | Japan | 423/125 |
| 272182 | 1/1970 | U.S.S.R. | 423/132 |

*Primary Examiner*—Herbert T. Carter
*Attorney, Agent, or Firm*—Glenn, Lyne, Girard & McDonald

[57] ABSTRACT

Alumina values are extracted from clay by the steps of pelletizing into spherical particles, calcining the pellets in a fluidized bed reactor, extracting the clay in about 30–40% nitric acid, purifying the basic aluminum nitrate produced, crystallizing aluminum nitrate nonahydrate, decomposing the nonahydrate in at least three steps, calcining the produced alumina and reconstituting the NO$_x$ gases to nitric acid.

12 Claims, 4 Drawing Figures

ALUMINA PRODUCTION BY NITRIC ACID EXTRACTION OF CLAY

FIELD OF THE INVENTION

The present invention relates to the production of alumina from clay and more specifically to an economically feasible and attractive clay extraction process using nitric acid extraction.

BACKGROUND OF THE INVENTION

The leaching of alumina from calcined kaolin clay with nitric acid has been studied and reported on by numerous investigators since at least about 1918. The patent and technical literature is replete with descriptions of the leaching of clay at the atmospheric boiling point or at superatmospheric pressures and correspondingly higher temperatures, techniques for removing iron from the resulting extracts, purification by crystallization of aluminum nitrate nonahydrate, the recovery of aluminum mononitrate, and the decomposition of the mononitrate to alumina with recovery of the nitric acid values for recirculation to the leaching step. Although the prior art teaches technically feasible individual operations for accomplishing each of the foregoing individual steps, when combined into a complete extraction/purification process the energy requirements for the variously conceived overall processes are so high that none has been exploited commercially and to the best of our knowledge, only one, the "Nuvalon" process, has ever been formally practiced.

SUMMARY OF THE INVENTION

Figure 1:
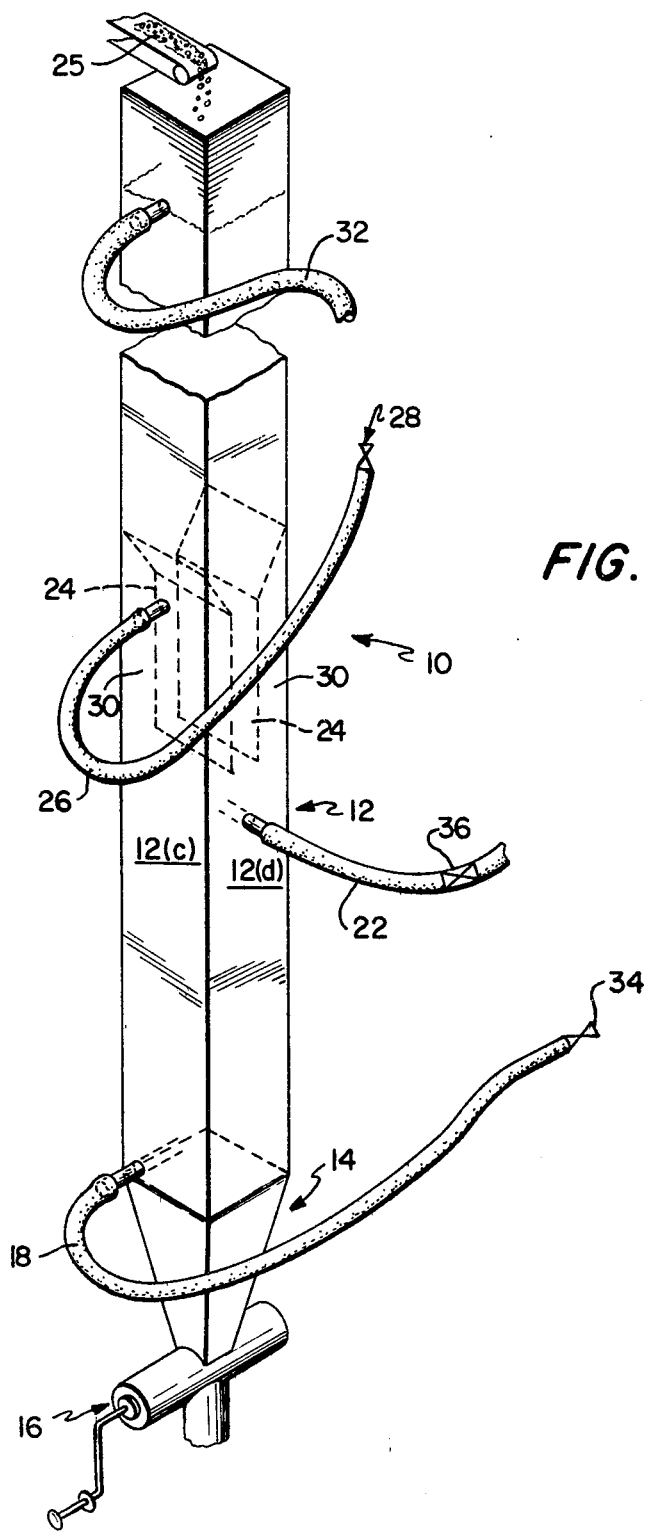
FIG. 1 is an elevational view of a digestion tower for continuous extraction as described in the instant application.

According to the present invention there is provided an economically feasible and attractive process for the extraction of alumina values from clay using nitric acid comprising the steps of:

1. pelletizing the clay into generally spherical particles having a diameter of between about 5–8 and about 1 mm and a free moisture content of between about 17 and 22%;
2. calcining the pellets formed in step 1 at a temperature of between about 1100° and 1550° F. in a fluidized bed reactor;
3. extracting the calcined clay pellets obtained in step 2 in about 30 to about 40% nitric acid for a period of between about 1 and about 4 hours at atmospheric pressure and a temperature of between about 220 and about 270° F. to produce an aluminum nitrate product solution comprising between about 8 to 13 weight percent alumina and between about 5 and about 20% less nitric acid than required by stoichiometry to form normal aluminum nitrate (i.e., a "basic" solution of aluminum nitrate);
4. purifying the "basic" aluminum nitrate product of step 3 by
    (a) precipitation of iron oxide by holding the product of step 3 for a period of at least about 2 hours and at a temperature of between about 80 and about 120° C. in the presence of a small amount (about 1 to about 3%) of iron oxide seed material; and
    (b) filtering the liquor derived from step 4(a) through a bed of the solids remaining from step 2 in the presence of a suitable flocculant to remove siliceous impurities;
5. crystalizing aluminum nitrate nonahydrate from the product of step 4(b);
6. decomposing the crystalized aluminum nonahydrate produced from step 5(a) in at least a three-step process involving;
    (a) evaporation of nitric acid from the molten crystals to provide a solution of basic Aluminum Nitrate containing at least about 16.5 and preferably at least about 20% by weight alumina and recovery of the heat of condensation of the vapors thus produced;
    (b) low temperature decomposition of the basic aluminum nitrate liquor to infusible basic aluminum nitrate solids at a temperature of between about 150° and 200° C.; for a period of at least about ½ hours; and
    (c) further decomposition of infusible basic aluminum nitrate solids in one or two stages at a temperature of between about 600° and 1300° F. for a period of from about 2 to about 7 hours;
7. calcining the residual metallurgical grade alumina at a temperature of between about 1900° and 2200° F., and
8. reconstituting to nitric acid the $NO_X$ gases from step 6(c).

Clay Preparation

The initial step in the nitric acid process for the extraction of alumina from clay involves clay preparation. According to the method of the present invention as-mined kaolin clay is crushed to within an appropriate size range, blended with water to a closely defined moisture content, and passed through a hammermill of appropriate design with a specified screen size. The resulting sized pellets are rolled without agglomeration, for a period of time to round the edges, corners, etc. and produce a relatively-hard, abrasion-resistant surface. The sized pellets are then dried in appropriate drying means and calcined at a temperature within the range of about 1100° to 1550° F., preferably in a fluid bed heated by in-bed combustion of a suitable fuel such as methane, fuel oil or powdered coal.

Pelletizing of the clay is described herein permits the use of highly-efficient counter-current digestion and washing operations at atmospheric pressure in subsequent process steps. The necessity of evaporating large quantities of relatively dilute wash liquor is avoided while at the same time the spent residue from digestion is washed to soluble impurity levels equal to or below those required to prevent contamination of the environment. Most alumina digestion operations described in the literature comprise the co-current digestion, over a substantial period of time, of powdered or coarse-ground calcined kaolin at atmospheric or superatmospheric pressure, followed by a large number of stages of counter-current decantation washing of the solids separated from the product liquor. Even when using coarsely-ground calcined clay from which fines have been separated before leaching, the requirements for maintaining the co-currently digesting slurry in a mixed condition, and for obtaining good mixing between the settled solids and wash liquors in the counter-current decantation washing stages, are impossible to fulfill without the generation of excessive quantities of very fine silicous slimes of around 10 micron and down particles. The slimes settle very slowly, and only to relatively dilute slurries. Large amounts of water, that must be subsequently evaporated, and many washing stages are required to obtain washed slimes which still may contain excessive quantities of nitrates. However, production by the process herein described of size-tailored pellets, with all the initially-induced edges, corners or protruding areas rounded off toward the spherical shape, permits practice of counter-current digestion and washing methods described in detail hereinafter that avoid the aforesaid washing difficulties and which also provide a product liquor containing dissolved alumina in excess of the stoichiometric requirements of nitrate. Such pelletizing permits use of an essentially zero-energy-requirement process for the removal of iron and silica values to levels sufficiently low that the final specifications with regard to these elements can be obtained in an aluminum nitrate nonahydrate crystallization process.

Many methods, mostly expensive, are well known in the art for preparing pellets of kaolin clay which can then be calcined to provide feed for digestion. We have used in the early stages of our investigations cylindrical extrusions produced by forcing properly-moistened clay through sized holes in a die, and round balls produced by agglomeration of dried, ground clay with water on a pelletizing disk.

According to the present invention, asmined clay crushed to a suitable maximum size by known means is blended with what additional water may be required, in for instance a mix muller, to obtain an intimate mixture of moisture and clay of a defined moisture content and is then passed through a suitable hammermill, comprising rotating knives on a vertical shaft surrounded by a 360° screen of specified apperture size, preferably between about 2 and about 8 mm, to produce a relatively narrow size range of damp particles. A preferred size range for the pellets is between about 1 and about 8 mm. Such particles or pellets are subsequently rolled in a drum, while taking due care to prevent agglomeration, for a relatively short period to press all jagged edges and the like into a relatively firm surface which tends toward a spherical shape and which is relatively resistant to abrasion. At the proper moisture content the particle size range of the product is controlled by the selection of the size of openings in the 360° product discharge screen of the hammermill. The free moisture content, i.e., other than water of hydration, is critical to the operation and must be held within somewhat narrow limits which vary somewhat with the composition of the kaolin material. Thus a sand-free kaolin material, but with variable iron oxide impurity content, requires a moisture content between about 19 and 21% but produces a more desirable size distribution at levels between 19 and 20%. At moisture levels of about 22% this material will blind the screens and pile up on the hammers and shaft requiring the mill to be shut down and cleaned out. At 18% moisture the product is essentially fine material unsuitable for the intended usage. Silica sand, which is frequently present in the kaolin bed, decreases the water requirement but does not prevent processing to suitable pellets at the proper moisture content. Thus a material which assays 21% silica sand on a dry solids basis causes screen blinding at moisture contents of 18 ½% and above, but is processable at 18% moisture. The optimum moisture content is judged to be a little below 18%.

On the other hand the introduction of calcined fine material, such as might be recovered from the off gases of a fluid bed calciner, increases the moisture content requirement, presumably because some water is absorbed into the pores of the calcined material. One such material, comprising 80 parts (dry weight basis) clay and 20 parts recycled calcined material, produced satisfactory pellets at a moisture level of 22%.

Pellets formed by the tornado mill-screen combination described hereinabove can be and preferably are, rolled to flatten out angular projections, corners and the like to minimize undesirable attrition in the fluid bed calciner and during digestion and handling of the fired pellets. A simple but efficient means for accomplishing this is a device, known to the art as a rolling drum, which consists essentially of a large diameter, long pipe or tube which may, if desired, contain one or more lifter means. As the drum or pipe is rotated pellets are fed at a feed end and pass slowly down the slightly inclined tube for a period of time which can be defined by the length of the tube and the inclination of the tube to the horizontal. In the passage the pellets impinge upon each other and roll along the sides of the tube with the concurrent impartation of energy to the surfaces of the pellets whereby protruding areas are pushed inwardly to the pellet body, the surfaces are smoothed and rounded, and the pellet is gradually messaged toward a spherical shape. It is also known to generate pellets by agglomeration in such devices, however in the instant case the desired pellet masses have already been generated so that it is necessary to minimize further agglomeration to prevent growth of the particles into undesirably large sizes. The rolling drum could of course be used to produce pellets in the first place, however, we have found that the maximum pellet size and the pellet size distribution is exceedingly difficult to control in a manner to produce, per pass, an economical proportion of pellets within the size ranges desired for the digestion operation.

The pellet should be subjected to the rolling action of the drum for periods upwards of at least 5 minutes but we have found that by 30 minutes rolling the pellets are sufficiently compacted that further improvement is slow. As the pellets are rounded and surface-hardened by the peening action of the bed of pellets and of the metal shell, water is forced to the surface of the pellet, increasing their stickiness and thereby facilitating agglomeration of the particles into undesirably large masses.

The time required in the rolling drum to develop an undesirable sticky surface varies somewhat inversely with the moisture content of the materials entering the rolling drum. Thus pellets made with 21% moisture will begin to develop undesirable agglomeration tendencies within about 5 or 10 minutes.

Pellets produced at 19% moisture have been rolled successfully for 15 to 20 minutes while pellets which were dried to 18 ½% moisture before introduction into the rolling drum have been rolled for 30 minutes or more. By the use of a standardized attrition test, which comprised digesting a small amount of the calcined clay pellets with nitric acid in a cylindrical bomb while rotating the bomb at a constant rate and at the conclusion of the digestion period measuring the concentration of attrited solids suspended in the liquor decanted from the bomb, it was found that low attrition rates were favored by longer rolling times at moisture contents of 18 ½% or higher, with the lowest attrition rates being obtained for pellets predried to 18 ½% moisture and rolled for 30 minutes. We have found however that the same benefits can be obtained without the need of the separate drying step if the pellets are rolled in the presence of a draft of relatively dry air, whereby at least a portion of the aforesaid generated surface moisture is removed as it is formed under conditions which do not bring about substantial drying of the interior of the pellet. Little or no heating of the air is required because in a continuous flow process the pellets enter the rolling drum already warm, i.e., above ambient temperature, from the conversion into heat of the energy imparted to the material during mulling and milling.

Calcination of the pellets for the aforesaid standardized attrition test were carried out at 1350° F. in the laboratory furnace with the production of low attrition rates and high solubility of the contained alumina. Similar tests using product calcined at higher temperatures gave lower attrition rates while preserving the same solubility of the contained alumina at calcination temperatures up to 1550° F. It is of course well known in the art that 1550° F. is about the maximum calcination temperature that can be employed without reducing the solubility of the contained alumina. Since as is well known the alumina solubility is excellent for calcination temperatures between about 1100° and 1550° F., the practitioner has available a wide temperature range for calcination. However, the range is restricted considerably by the choice of fuel and the choice of the calcination equipment. Thus when using methane, temperatures must exceed about 1400° F. for proper combustion. Only a little lower temperatures can be used with fuel oil or with coal. Rotary calciners are somewhat difficult to control sufficiently to operate at temperatures, for instance, high enough to utilize natural gas while at the same time preventing over-burning of at least a portion of the material. This difficulty is surmounted with use of a fluid bed calcining means which, as is well known in the art, can be controlled easily to within a range of 15° to 30° F. of a specified temperature so that even a 1500° F. bed temperature may be used without danger of creating hot spots in the bed.

Thus by the aforesaid relatively inexpensive method of preparing substantially rounded pellets within a size range eminently satisfactory for use in fluid beds, and in themselves relatively resistant to attrition, we are able to calcine the said pellets within the temperature range of about 1100° to 1550° F. without danger of overburning any of the material, and at the same time obtain the benefits of the lower attrition rates so provided. When used in conjunction with the digestion and iron removal processes described hereinafter these pellets readily provide a suitable basic alumina solution for use in iron removal with very low levels of suspended silicious solids in the liquor. This small amount of solids, after accretion thereon of hematite in the iron removal process, settles easily in known settling means and can be filtered and washed with a minimum introduction of wash water which subsequently must be evaporated.

Digestion

The second step in the nitric acid extraction of alumina values from kaolin or similar materials involves digestion of the calcined clay pellets with nitric acid. In this aspect of the invention, calcined clay pellets of about −4 to +16 Tyler mesh screen size prepared as described hereinabove are digested with 30 to 40% nitric acid solution and thoroughly scrubbed with wash water in a batch-continuous counter-current contacting assembly, to produce an aluminum nitrate product liquor comprising about 10 to 11% alumina and 5 to 20% less nitric acid values than required by stoichiometry to form normal aluminum nitrate (i.e., a basic aluminum nitrate solution) and also minor amounts of dissolved iron and other undesirable impurities. The batch-continuous counter-current contacting system comprises a plurality of digestion vessels each designed to provide a liquid-permeable bed of the clay pellets 10 to 20 feet high, and provided at the top with means for introducing the fresh charge of clay pellets and means for removing vapors to a common header and at the bottom with suitable means for discharging extracted, washed pellet residue, and connected each to the other by suitable liquid conductance means, including pump means and suitable valving whereby each reactor, as desired, may be isolated from all others. By this means, all of the reactors can be connected in an endless circle arrangement. The reactor-connecting liquid conduction means are also connected through suitable valving and liquid conduction means to supply headers for the introduction or removal, as desired, of digestion acid, weak wash acid, wash water, product liquor and wash liquor. All valves may, if desired, be hand operated. However, because of the large number of valves and pumps and a need for a time sequence of operation, it is preferable that the valves be monitored and operated automatically as by a suitable mechanical or electronic time-sequencing device such as are well known in the art.

During operations, a mixture of fresh acid and wash liquor near boiling temperature is introduced at the base of a first reactor which contains the pellet charge longest exposed to the digestion acid and pushed upwardly through the bed of the first reactor and pumped upwardly through the pellet beds of about 1 to 3 additional reactors in series containing partially-digested clay pellets and thence pumped to the product liquor removal header and thence to an iron removal means described hereinafter. Simultaneously, fresh water is introduced to the base of a second reactor and pumped sequentially upwardly through the beds of 1 to 3 additional reactors, as desired, in series and thence to the base of the first reactor, which is next in sequence, where it mixes with the fresh acid pumped upwardly through the bed of the first reactor. Meanwhile the reactor sequentially next to the product liquor off take is charged with its appropriate quantity of fresh clay pellets and sufficient 30 to 40% nitric acid to cover the bed and is allowed to react for 15 minutes or longer. Periodically, at, for example, ½ hour periods, the product liquor removal point is moved to the downstream side of the fresh-charged reactor, the fresh water injection point is moved from the second reactor to the feed line to the base of the next reactor in sequence and the acid feed is moved to the upstream side of the first reactor and extracted washed pellets substantially free of alumina and nitrates are discharged from the second reactor, thus preparing it to receive a fresh charge of clay pellets and digestion acid as aforesaid. As the above described steps are repeated, period by period, the said first reactor means cycles sequentially through the said plurality of endlesscircle connected reactors back to the point of beginning and thence around the circle again. In a slightly preferred modification, which requires additional piping, the wash liquid is withdrawn through a header to a mix tank where it is mixed with strong acid to form the 30 to 40% solution before introduction to the base of the first reactor. While this is slightly more expensive to build, it is thought to give somewhat better control of the system. During the above steps all reactors which contain digestion acid, at least, are opened to the vapor header to vent water and acid vapors generated by the heat liberated by the exothermic alumina-dissolving reaction. These vapors are condensed in suitable means to recover the heat for use in warming fresh acid entering the system and the condensate is blended into the digestion acid. The alumina concentration of the product liquor will vary from moment to moment throughout each of the operating periods. The time-average composition is controlled to within the range of about 10 to 11% alumina, 5 to 15 or 20% less than the stoichiometric requirement of nitric acid, by maintaining a steady flow of digestion acid to the base of the first reactor at a rate and concentration predetermined during early operation of the digestion system by varying the concentration and addition rate of the acid while noting the time-average concentration of the product liquor, preferably averaged over 2 or more operating periods.

If, in addition to the aforesaid 15 to 20 minutes or so reaction time provided between fresh clay pellets and the covering layer of acid, about 2 hours of counter-current contact of the clay pellets with digestion acid is provided in the manner described, extraction of upwards of 90% of the alumina fed within the fresh clay pellets, usually 95% or more, will be obtained when the clay pellets have been calcined within the known temperature range of about 1100° to 1550° F.

The efficiency with which the extracted clay pellets can be washed is quite high. Tests involving the equilibration of nitric acid and aluminum nitrate values between liquid in the internal pores of the leached pellets and external water have indicated an approximate 90% approach to equilibration within about 15 minutes. Thus a conservative estimate for the height of a transfer unit in the differential-contact washing system is the linear distance within the bed that an element of wash liquid will move in about 20 minutes. Once the quantity of available fresh water has been determined from the overall plant acid and water balance, including the degree of separation between acid and water obtained in fractional condensation during the evaporative crystallization of aluminum nitrate nonahydrate as described below, the concentration of acid and aluminum nitrate retained in the washed pellet residue can be readily calculated for any selected number of reactors to be employed in the washing circuit. Since an amount of the condensate recovered in fractional condensation of crystallizer vapors will contain upwards of about 2% nitric acid it is advantageous to introduce this low-acid stream into the washing circuit upstream of the second reactor, wherever in the washing circuit its acid concentration is equal to or less than the acid concentration of the wash liquor coming to that location.

The reactors used in the instant process consist of a lower conical section, designed in known manner to facilitate discharge of the approximately spherical clay pellets, joined to an upper cylindrical section, which in turn, if desired, may be joined through a short conical section to a cylindrical section of larger diameter to provide a zone for the settling of particles against the upward flow of the liquid and steam. The cylindrical section is capped with a vapor-tight cover fitted with a vapor outlet and a clay pellet inlet port, each suitably valved, and at the side, a distance down from the top to provide vapor-liquid disengagement space, a liquid overflow port which may include a screen across the aperture to prevent the carry-over of large particles and is designed for connection to the aforesaid reactor-connecting liquid conductance means. The bottom of the first said conical section is fitted with a suitablyvalved discharge port for the discharge of spent pellets and substantially contiguous thereto, preferably on the side of the said cone, a port for introduction of the liquid feed to the reactor. For a plant extracting about 1,000 tons per day of alumina and operating on a 30-minute cycle time the reactor is dimensioned to contain about 2,000 cubic feet of pellets (53 tons) with a pellet bed depth of 10 to 20 feet, preferably 12 to 15 feet. The depth of the bed is not particularly critical. It has been observed in a cylindrical 10-foot deep bed that the upper 6 to 12 inches of pellets may be in a fluidized condition which detracts from the true counter-current nature of the operation with potential minor decreases in the overall extraction of the alumina but is otherwise not detrimental. The reactor is operated preferably at about atmospheric pressure but may, if desired, be operated at elevated pressures up to the autogenous pressure generated by the vapor pressure of the liquid at the liquid temperature attained by virtue of the heat release accompanying the digestion reaction. It is known that operation at high temperatures permitted by the increased pressure will increase somewhat the rate of the digestion reaction but the beneficial effect is outweighted by the cost of constructing reactors to contain superatmospheric pressure. Construction materials are selected as desired from the group comprising the austinitic stainless steels 304L and 316L, the low-carbon, 26% Cr, ferritic stainless steel available under the trade name E-Bright 26-1, acid proof concrete resistant to nitric acid, polymerised fluoro-carbon (for instance DuPont Teflon) lined steel and of course such exotic materials as titanium, zirconium and tantalum. As is well known in the art the corrosion resistance of ferrous materials to nitric acid depends primarily upon the chromium content of the metal when the carbon content is low.

Digestion acid is supplied to the reactors at temperatures above about 80° C., preferably near the atmospheric boiling temperature. Incoming plant acid within the concentration range of 50 to 60% HNO3, usually about 55 to 58% $HNO_3$, at around 100° to 150° F. is warmed by counter-current heat exchange with the aforesaid vapors from the reactors and is further warmed by blending with hot condensed vapors and with the hot wash liquor, which has extracted heat from the pellets and adhering mother liquor during the washing operation, and by the heat released during mixing. Thus, no external source of heat is required except during start-up of the cool system during which the digestion acid is heated to near boiling inside the tubes of a titanium-tubed shell and tube heat exchanger means supplied on the shell side with steam.

According to a highly preferred embodiment of the present invention, the digestion/extraction operation is performed in a continuous exterior of the general configuration depicted in FIG. 1. The advantages of a continuous extractor over the semibatch counter-current system described hereinabove are well known to those skilled in the art and will not be elaborated here. Suffice it to say that continuous counter-current extraction enjoys the advantage of counter-current extraction efficiency while producing basic aluminum nitrate solution at atmospheric pressure and while maintaining the physical integrity of the clay pellets. In a continuous extractor the clay pellets enter the top of a vertical extraction tower and discharge continuously from the bottom with wash water entering at the bottom and flowing upward counter-currently to the downward flow of solid pellets. Concentrated extraction liquor enters at an intermediate level of the extractor and joins the wash liquor in an upward flow direction until enriched aluminum nitrate liquor overflows the top of the extractor column. Because of the highly exothermic nature of the extraction reaction, some type of venting means must be employed to allow vapors generated by the heat of reaction to escape from the extractor in such a manner as to minimize disruption of the extraction process. Generated vapors can at the very least fluidize the clay pellet bed and even stop the downward flow of pellets.

FIG. 1 depicts a reaction tower deesigned for continuous extraction. As shown in FIG. 1, the tower or column 10 comprises a vertical column portion 12 comprised of four sides 12(a), 12(b), 12(c) and 12(d), [12(c) and 12(d)] being shown, joined at right angles by appropriate means. The lower portion 14 of the column 12 is tapered and leads to a solids discharge valve 16 shown in greater detail in FIG. 2. Tube means 18 are provided near the base of column 12 to provide inlet of water which moves counter-currently to the downward flow of pellets inserted through the top of the column 12. Inlet means 22 is provided in the column intermediate inlet means 18 and trap means 24 whose function will be described hereinafter. Inlet means 20 provides for the introduction of extraction nitric acid. Trap means 24, which may be of variable configuration only one of which is depicted here, are provided in column 12 to define traps 30 which trap gas generated by the exothermic extraction reaction. Such produced gas is vented from trap 30 by one or more suitable vent means 26. Vent means 26 is provided with suitable control valve means 28 as to provide gaseous venting of trap 30 provided by trap means 24 but not removal of either pellets or extraction liquor. Design of such means is within the skill of the art and will not be elaborated upon here except to say that a float valve activated by the presence of extraction liquor in the trap means at a level which threatens flow thereof into the vent means provides one useful embodiment of such a control valve. Column 12 is further provided with overflow means 32 which serves to remove excess extraction liquor and carry it to suitable receptors (not shown) for further processing in accordance with the process described herein.

Each of inlet means 18, and 22 is of course provided with suitable control valve means 36 and 32 respectively which regulate the flow of the particular fluid being delivered to the reactor column 12.

In practice, pellets are fed into the top of column 12 wherein they contact a suitable mixture of water and nitric acid feed supplied by the various inlet means. The water entering the base of the column keeps the pellets in a somewhat expanded bed state as does the gas generated by the exothermic reaction. As the pellets pass down through the column they are heated by the heat produced by the reaction of $Al_2O_3$ with $HNO_3$ and after passing the traps 30 contact fresh nitric acid feed at a concentration of between 30 and 40% by weight $HNO_3$.

At this point extraction is at a maximum. As the pellets pass down through column 12 to contact incoming fresh water, they are washed and removed from the column by discharge valve 16. Of course, the rate of removal of discharge valve 16 and the rate of addition to the top of column 12 should be such as to maintain a constant column charge and to insure adequate residence time in the column 12 as to insure optimum aluminum nitrate extraction from the pellets.

Figure 2:
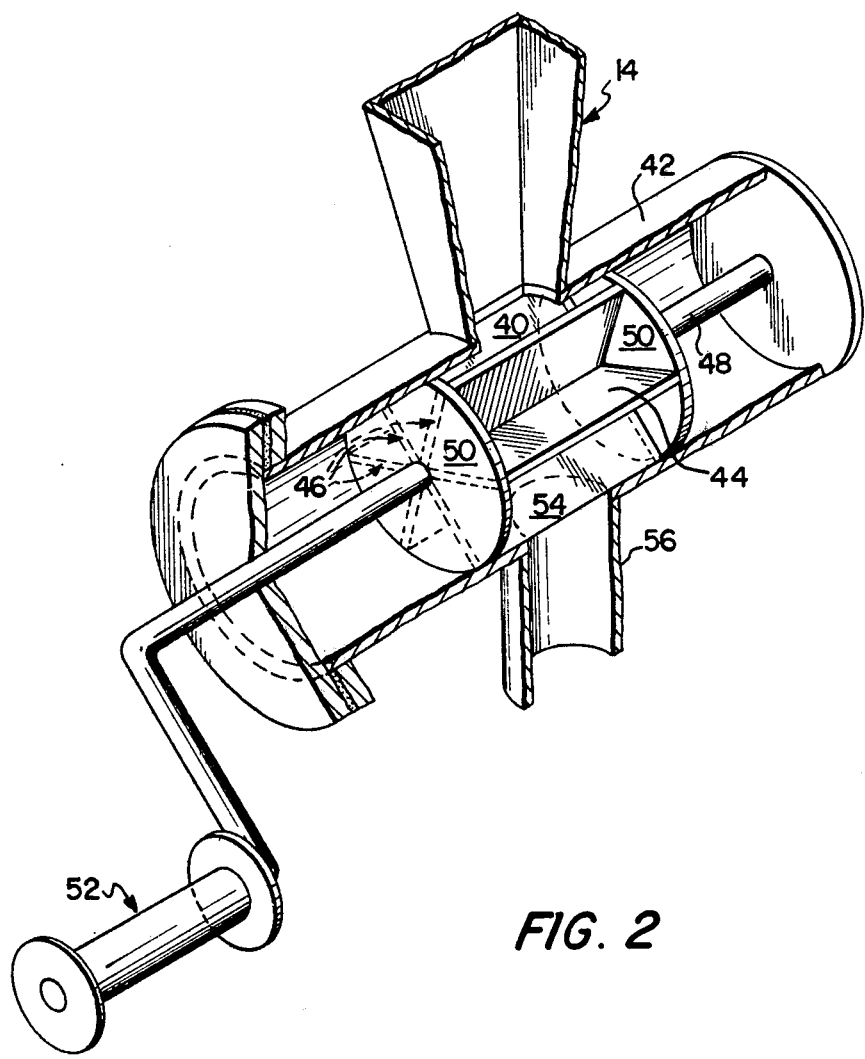
FIG. 2 is a cutaway view of the discharge valve of the digestion tower shown in FIG. 1.

A suitable configuration for discharge valve 16 is shown in FIG. 2. As shown in this drawing, tapered portion 14 of column 12 is connected via orifice 40 in valve housing 42 to a series of radially disposed compartments 44 formed by planar members 46 which radiate from shaft 48 and contact at their ends circular plates 50 to define a compartmentalized cylinder rotatable within housing 42 by turning crank 52 attached to shaft 48. As crank 52 is turned, each of compartments 44 is sequentially accessed to portion 14 of column 12 thereby receiving a charge of extracted pellets. As the crank 52 is turned further charged compartment 44 is accessed via a second aperture 54 in valve housing 42 to discharge its charge of pellets into discharge means 56 from whence they are transported for disposal.

Thus, using this apparatus continuous countercurrent extraction of clay pellets may be achieved in a simple yet effective manner.

Subsequent to extraction in one or a combination described hereinabove, of the extraction technique, the extraction liquor is passed via suitable means to an iron and silica removal step.

Aluminum nitrate liquors produced as described hereinabove comprise generally, on a time average basis, about 10 to 11% alumina, 2 to 20% less nitric acid than required for formation of the normal aluminum nitrate, iron equivalent to 0.1 to 0.5 wt. percent $Fe_2O_3$, dissolved silica (or silicic acid) at about the solubility level, silicious solids suspended in the liquor within the range of about 100 to 1,000 ppm, and other dissolved impurities such as potash, phosphorous, chromium, zinc and the like which have been extracted from the clay along with the alumina. Most of the soluble impurity elements may be reduced to satisfactory levels by a fractional crystallization of aluminum nitrate nonahydrate (ANN) according to the teachings of U.S. Pat. No. 3,804,598 to Royce et al and assigned to the same assignee as the present application. However, this process alone will not yield sufficient purification to meet the specifications for metallurgical grade alumina with respect to silica, iron and chrome. A process for the removal of chrome has been described in U.S. Pat. No. 3,615,813 to Wilbur Don Wise and assigned to the same assignee as this application. Consequently, it is desirable to have a combination process for the reduction of iron and silica contamination levels to levels suitable for final purification in ANN crystallization, which at the same time permits the removal of chrome according to the practice of Wise, if such is desired.

Iron Removal

The removal of iron from acid-deficient (basic) aluminum nitrate liquors, by precipitation substantially as hematite onto hematite seed particles at temperatures upwards of about 80° C., has been described by Thor Mejdell et al in U.S. Pat. Nos. 1,421,804 and 1,444,160. Others since have confirmed the basic disclosures and have offered improvements such as neutralizing extract liquor acidity with basic liquor recycled from ANN crystallization, operation under super-atmospheric pressure at temperatures above the boiling point of the basic liquor to enhance the precipitation of iron, or to so select and blend clay materials fed to the step of digestion with nitric acid as to maintain a minimum ratio of iron to $Al_2O_3$ in the clay feed. These approaches generally are technically feasible but unnecessarily expensive in that they require additional operating steps, impose onerous high temperature and pressure conditions or require selective mining and blending operations with attendant restriction of the available raw materials that can be used in order to maintain relatively high-iron clay feed stocks. The process to be described insofar as iron removal is concerned essentially follows the simple teachings of Mejdell U.S. Pat. No. 1,421,804 lines 82 to 96, in which a basic aluminum nitrate liquor containing iron values in solution is contacted with iron oxide previously precipitated from the liquor. Additionally, the counter current digestion process inherently practices U.S. Pat. No. 1,444,160 in that iron from the incoming clay that is dissolved in the acid stages in part precipitates in the first stages where the liquor is basic, thus causing the addition of previously-precipitated iron solids to the digestion operation. Although this action occurs, it is neither advantageous nor detrimental and any otherwise suitable clay may be used as raw material in the instant process without regard to its iron content. The only observable effect is that the iron content of liquors produced from high-iron clays may be toward the low end of the cited range, and of liquors produced from low-iron clays may be toward the high end, except as limited by the iron content of the clay.

Representative data on the removal of iron from basic aluminum nitrate liquors according to the teachings of Mejdell is cited below. Iron-containing basic aluminum nitrate liquor which assayed 11.07% $Al_2O_3$, 0.39% $Fe_2O_3$, 37.92% $HNO_3$ and 0.016% suspended silicious solids, from which it was calculated, from the analysis of $Al_2O_3$ and $HNO_3$ only, that 7.6% of the dissolved $Al_2O_3$ was in excess of that required to form normal aluminum nitrate with the $HNO_3$ in the solution, was placed in a stirred vessel maintained by external controlled heating means at a temperature of 112° C. An amount of freshly precipitated seed material equal to about 1.08% of the weight of the liquor, which seed material had been prepared in several previous precipitations of iron from similar solutions on to the solids carried over in the liquor from digestion, without addition of any seed material from other sources, and which had not been further treated in any manner such as by washing or by heating or the like, was added to the liquor and the mixture was continuously stirred. Samples of the slurry were removed from time to time and assayed for dissolved $Fe_2O_3$ after filtering out all suspended solid material. Solutions comprising about 0.025% $Fe_2O_3$ are produced by this technique in about four hours. In tests carried out to generate the first portion of precipitated iron material to be used as seed, in which nothing was added to the liquor and the suspended silicious solids content was about the same as aforesaid, a time of 48 hours was required to precipitate the iron to about the same level. When the solids filtered from this batch were added to the second batch of digest liquor the time required was only 16 hours and with the 1.08% seed addition the time required to produce a liquor sufficiently low in iron to permit final purification to specification grade alumina by ANN crystallization was only four hours.

To further optimize iron removal the slurry may then be treated with a suitable flocculant and the solids allowed to settle out in settling means.

A number of commercially available flocculants are suitable for use in hot aluminum nitrate solutions but, since many of the flocculants available decompose very rapidly, presumably because of reaction with or oxidation by the nitrate ion, it is desirable to pretest in the laboratory any flocculant proposed for use on a commercial scale. Methods of testing are well known in the art and several are discussed in "Chemical Engineers Handbook", Fifth Edition, Page 19-45, by Perry & Chilton, McGraw-Hill Book Company, New York, N.Y. One simple method comprises mixing, in a 2,000 $cm^3$ standard chemical laboratory graduated cylinder standing within an oil bath heated to maintain the desired temperature, of an amount of the slurry to be settled and of the test flocculant and visually observing the formation of flocs, the stability of the flocs during settling, and the turbidity of the supernate liquor after the flocs have settled for a selected period of time. Among the flocculants tested by this method the polyacrylamide-based non-ionic, cationic, and anionic polymers have formed stable, settleable flocs and presently are preferred. As is known in the art, we have found that the relatively low molecular weight polymers give a greater supernate clarity than higher molecular weight polymers, but may provide a somewhat slower settling rate of flocs. Two cationic polyamines that were tested appeared to be too unstable for use. Although one formed flocs initially, the flocs lasted only about 3 to 5 minutes, too short a time for commercial use. A cationic Guar of unknown molecular weight, MRL-100 of Polymer Specialties Company, formed flocs that settled well but left a turbid supernate. A presently preferred flocculant is Superfloc ® 16, a non-ionic polyacrylamide of 4 million molecular weight marketed by American Cyanamid Corporation, which gives good settling rates and supernates comprising only about 150 ppm suspended solids after 30 minutes of settling. It is known in the art to blend such a low molecular weight polymer with polymers of 10 to 20 million molecular weight to increase the bulk settling rate while maintaining supernate clarity. Usually, flocculants found suitable for settling have also been found to be suitable for use in filtration of the supernate liquor for the removal of silica values to be described hereinafter.

This material, as will be elaborated below, may also be used to remove siliceous material present in the extract liquor. In order to achieve the desired levels of iron removal, it is advantageous to maintain in suspension in the liquor a relatively small amount of iron oxide seed. Seed loadings in the range of from about 1 to about 3% by weight of the extraction liquor have been found most satisfactory for this purpose. Although higher seed loadings during the precipitation are useful it is preferred to maintain these levels of loading because of the rather substantial cost of the flocculant material required to separate the precipitated $Fe_2O_3$ from the extract liquor after precipitation, the higher the seeding level the more flocculant material being required to accomplish this separation. In addition, since the seed level is maintained by recycling a relatively dilute solid suspension from the settler, which concentrations generally will not exceed about 20% by weight, unnecessarily high seed loadings require simultaneous recirculation of unnecessarily large volumes of liquor.

Silica Removal

It is frequently stated in disclosures pertaining to the acid extraction of alumina from clays that silica is insoluble in the acid liquors and no operations to remove it are necessary. However, data presented in Seidell "Solubilities of Inorganic and Metal-Organic Compounds" Volume 2, page 1453 show that silica has a finite solubility in acid solutions that decreases as acid concentration increases but that increases 2 to 3 fold as the solution temperature is increased from 25° to 90° C. We have been able to reduce the total silica values in hot, basic, aluminum nitrate liquors comprising 9 to 11% $Al_2O_3$, treated as described hereinabove to reduce the iron content, to within the range of about 0.0025 to 0.0040% of the liquor by filtering through a thin bed either of unsettled solids formed by repeated filtration of the liquor through a fine filter paper or of finely-ground, washed, digested solids recovered from the digestors, and by our preferred method of filtration to be described hereinafter. On the other hand, in a series of cyclic tests made to determine the relationship between various impurity concentrations in aluminum nitrate mother liquor and in aluminuum nitrate nonahydrate crystals crystallized therefrom, comprising repeatedly adding fresh feed to a previously prepared mother liquor and crystallizing aluminum nitrate nonahydrate therefrom to prepare a new mother liquor, silica values in the mother liquor of at least 0.008% have been attained while the washed crystals obtained therefrom assayed only 0.001% $SiO_2$. It is thought that the repeated formation and removal of crystals in these experiments should have removed, as crystal nuclei, all particulate $SiO_2$ values including those of colloidal size so that the $SiO_2$ values found in the mother liquors were in the dissolved state.

The said mother liquor sample also comprised 0.425% $Fe_2O_3$ whereas as described hereinabove values of 0.02% to 0.04% $Fe_2O_3$ are attained by contacting high-iron liquors with previously-precipitated iron solids. It is speculated that, in similar manner to iron, the attainment of low dissolved $SiO_2$ values is aided by the presence of silicious solids. It has also been observed that digestor slurries, which had been allowed to cool and then stored cool for several days before use, yielded after filtration silica values of 0.001 to 0.002% but that previously-filtered liquors stored cool for several days in the absence of solids showed no significant change in silica content after refiltration. Thus a process comprising cooling and holding liquors in the presence of silicious solids and then filtering could produce lower silica values than our preferred process, but could require rejection to the atmosphere of an amount of thermal energy which we prefer to use beneficially in evaporation and crystallization operations described hereinafter.

The silicious values easily pass through fine filter paper, such as, for instance Sleicher & Schull No. 589 Blue Ribbon which is used in quantitative analyses by many analytical laboratories, and present a difficult filtration problem on an industrial scale. We have tested various commercially-viable methods such as sedimentation in a centrifuge in the presence of flocculant, pressure filtration through pre-coated filters, and sand-bed filtration with the aid of flocculants. We presently prefer filtration in a sand-bed filter in the presence of a carefully-controlled amount of a suitable flocculant such as, for instance, the aforedescribed Superfloc 16, and with either gravity drainage or pressurized flow of the liquor through the bed. We have found that this method, when properly operated and controlled, provides equal or better silica removal compared to other methods, requires relatively inexpensive equipment and a minimum of operating procedures and labor, and the working element (or sand bed) can, if desired, be formed partially or entirely from the readily available digested, washed solids residue from digestion that otherwise is discarded to waste.

According to a preferred practice of filtration to remove silica values we take a portion of the calcined, digested, and washed pellets of clay of about 1 to about 8 mm diameter that are the waste product of digestion, crush and screen a portion, as desired, to provide a further gradation of particle sizes down to around $\frac{1}{4}$ mm, and form them in a vessel into a graded bed about 10 to 20 inches thick, which may be supported on a suitable screen, or preferably on a graded bed of quartz pebbles and sand in accordance with the known methods of making sand bed filters, and pass therethrough the silica contaminated liquor to which has been added a carefully measured amount of a suitable flocculant such as the presently preferred Superfloc 16. The liquor may be allowed to drain by gravity through the bed, or it may be pumped through the bed provided the liquor discharge rate is throttled so that the flow rate does not exceed a critical rate which permits more or less of the silica values to pass through the bed unextracted. The flocculant is generally added by first dissolving it in water to form a 0.05 to 1% by weight solution as recommended by the manufacturer. We have found that this solution may be added to the impure liquor in batches from time to time or continuously as desired. It is preferred, however, to add the flocculant solution continuously in order to gain the maximum degree of control over its concentration in the liquor. Flocculant control is critical to good operation of the bed, since on the one hand a sufficient amount must be present to remove the silica and on the other hand excess flocculant reduces the lifetime of the bed due to plugging which occurs. Further, the desirable flocculants are slowly destroyed by action of the hot liquor, at rates which increase with increasing temperatures of the liquor, and the flocculant addition rate should be adjusted accordingly. That is, with the liquor controlled at 105° C. the addition of 0.0006 pounds of flocculant per ton of liquor maintained the silica in the effluent at 0.0035% of the liquor and yielded a flow rate of 59 gallons per hour per square foot averaged over 50 minutes, while at 125° C. the same operation required 0.003 pounds of flocculant per ton of liquor. Generally, flocculant loading in the range of from about 0.0004 to about 0.004 pounds per ton of liquor in the temperature range from about 80° to about 125° C. has been found satisfactory.

The ability of the hot liquor to destroy the flocculant is highly advantageous. It has been observed, during filtering operations in transparent equipment, that the flocculant grows in the bed in the form of strings or strands which can choke the bed and reduce the flow of liquor through the bed to undesirably low levels when too high a level of flocculant is added. Holding the liquor in the bed about boiling temperature, i.e., around 120° C. for alumina concentrations on the order of 11%, for a period of 15 to 30 minutes is sufficient to destroy the flocculant strands when using a preferred polyacrylamide flocculant. A more stable flocculant than Superfloc 16 would of course require a longer time. Once the flocculant strands have been destroyed the bed is easily and effectively backwashed by passing an amount of the previously treated liquor upwardly through it. The backwash liquor is returned to the beginning of the iron removal operation wherein the fine particles may grow by precipitation of hematite thereon to sizes that can be removed in the settlers, or if desired to digestion. After backwashing in this manner the bed can be reused in another cycle of silica removal. Such beds have been successfully so regenerated 5 times, with no discernable diminution of the capability of the bed to remove silica from solution.

It is desirable to monitor the silica content of the treated liquor substantially continuously. It is known to decompose the solution to alumina and determine the silica therein spectrographically, however such alumina produced from the streams produced according to the processes described herein contains sufficient amounts of iron to interfere with the silica determination and cause the so-determined silica values to be lower than are actually present. However, atomic absorption spectrometry is unaffected by iron concentrations and if desired may be operated continuously to determine silica concentration. Results can be quite accurate if proper attention is paid to the high viscosity and density of aluminum nitrate liquors. As commonly employed, atomic absorption spectrometry comprises the aspiration of a liquor sample through a small-diameter tube into a flame wherein the liquor is atomized and the spectral density of selected lines in the atomized material is obtained for comparison with similar densities obtained on known standards. The aluminum nitrate solutions, even when diluted 10 to 1 with pure water, are sufficiently viscous that less sample will be aspirated into the flame than will occur with a straight water solution of silica which otherwise would be preferred for calibration of the instrument. Thus it is essential for accurate silica determinations that the standards used for comparison be prepared with essentially the same aluminum nitrate content so that aspirated quantities will be identical. Undiluted aluminum nitrate liquor is too viscous to handle with normal aspiration equipment supplied with atomic absorption instruments but it is within the skill of the art to provide means for the injection of controlled, uniform quantities of even this liquor into the flame, if it is desired to avoid the dilution step.

The following examples will serve to illustrate the commercial attractiveness and methods of practicing our preferred method of filtering silicious values from aluminum nitrate solutions. The solutions used comprised 10 to 11% $Al_2O_3$ and around 160 ppm of silica values present as dissolved silica and overflow solids and were filtered hot to demonstrate operability at the highest temperatures that might be maintained in large volumes of digest liquors trated as described hereinabove for the removal of iron in vessels suitably insulated to minimize the wasteful loss of thermal energy to the atmosphere. The examples presented have been selected from the more extensive and more illustrative tests with the presently preferred low molecular weight non-ionic polyacrylamide Superfloc 16. The sand beds, of stated thickness, were formed of previously-digested pellets ranging in size upwards of about ¼ mm and supported on a stainless steel screen in a tube externally-heated to prevent cooling of the liquor.

Flocculants so far found to be satisfactory for filtration use are the non-ionic and cationic polyacrylamides. An anionic polyacrylamide and the cationic Guar found useful for settling by the test described hereinabove were found not be sufficiently stable for use in filtration. Flocculants proposed for plant use should be tested first in a laboratory sand bed filter.

A preferred embodiment for practicing the removal of iron and silica by the processes described above is as follows. Basic liquor from digestion, comprising 10 to 11% alumina, undesirable amounts of dissolved iron and some suspended silicious solids, is blended in a stirred reactor tank with solids-containing slurry from the settler and other recycle streams. Sufficient recycled solids are introduced to maintain a concentration of suspended solids within the reactor tank of about 1 to 3% by weight, or higher if desired. Overflow slurry from the stirred tank passed to a second stirred tank reactor and in turn overflows to a third stirred tank reactor and then to a settling tank wherein it is mixed with a controlled amount of an aqueous suspension of flocculant, which may be added into the feed well of the settler or preferably is added ahead of an inline stationary blender whereby more efficient blending of the flocculant with the slurry is obtained. The first reactor is preferably of a size to contain 3 or 4 cycles of the output of the batch-continuous counter-current digestor described hereinabove, which may be about 1½ to 2 hours retention time, and the second and third reactors, and additional reactors if desired, are dimensioned to provide additional retention time as needed so as to insure at least 3 to 4 hours total contact time for substantially all portions of the slurry. As is well known in the art, a single stirred-tank reactor comprising a volume equal to 4 times the hourly rate of out-flow has a mean residence time of 4 hours, but if the over-flow is broken into small elements, at least a portion of the elements will spend less than 4 hours in the reactor. To approach the batch reactor conditions it may be desirable to add additional reactors in series to ensure that substantially all the liquor elements are treated for the minimum required period of time. Thus 4 tanks in series, each of 1 hour retention time, provide results substantially equivalent to a 4 hour batch reaction while a single tank of 4 hour residence time will provide inferior results.

In the present process excess treatment time is not detrimental. Thus any surge capacity, i.e. excess storage capacity, that designers may wish to provide between digestion and iron removal may be incorporated into the capacity of the first stirred reactor and the size and number of any additional stirred tank reactors may be adjusted accordingly to provide the minimum of about 4 hours treatment time for a 1%-by weight-of-liquor seed addition.

Slurry overflowing the last-in-series stirred tank reactor is mixed with a diluted aqueous solution of flocculant pumped from a holding tank into a stationary in-line-blender, which is well known in the art and which may consist of 2 or more shaped baffles inserted in a pipe of such shape and spacing as to alternate the direction of rotation of the liquor as it flows therethrough, and is introduced to the feed well of the settler. The settler preferably is a covered standard-design thickener with rake, feed well, clear liquor overflow, and controlled-rate pulp discharge means but other types of known liquid-solids separators may be used if desired. Since increasing solids quantities require increasing consumption of the expensive flocculant material, increasing size of the settler and increasing rates of recirculation of the solids concentrate, it is economically desirable to operate the stirred tank reactor toward the lower end of the solids concentration range necessary to produce a liquor with a dissolved $Fe_2O_3$ concentration within the range of about 0.02 to 0.03%.

Continuously, or from time to time as may be desired, a portion of the concentrated solids stream, which comprises usually 12 to up to about 20% solids concentration by weight, containing an amount of solids about equal to the sum of the rate of suspended solids input plus the hematite precipitated in the said stirred reactor, is extracted from the recycle stream and treated in a separator and washer, which may comprise for instance pressure filtration and washing means or washing centrifuge means or other known means, to produce a first stream of well-washed solids which is conveyed to waste disposal; and a second stream, comprising a mixture of the liquor separated from the solids slurry feed and the wash water from a supply, that is recycled to the stirred first reactor or any of the subsequent stirred reactors as may be desired. Since that portion of the wash water which is introduced into the main liquor stream must subsequently be evaporated with the consumption of thermal energy, it is economically desirable to select from the numerous commercially available separation and washing means one which minimizes the consumption of wash water.

Supernate liquor, comprising about 0.02 to 0.03 wt.% dissolved $Fe_2O_3$, overflowing the settler is expected to contain suspended solids within the range of 50 to 150 or so ppm, and is filtered by our preferred process which will now be described.

The de-ironized liquor from the settler is pumped through an in-line stationary blender, which may be of the same construction as the first stationary blender, wherein it is blended gently with a controlled amount of dissolved polymer. It is especially important that the blending be gentle since as is well known the high-molecular-weight polymers may be sheared into less-desirable fragments by excess agitation. Methods of preparing the polymer solutions without excessive shear are set forth in manufacturers instructions for the preparation of aqueous solutions of such polymers. The polymer-containing liquor is directed through one or more sand bed filters, out through an exhaust header, and finally out of the system through a drain which desirably includes a suitable flow rate control means to restrict the maximum rate of flow through the sand bed filters. A portion, as required, of the liquor may be retained in a holding tank until needed for back washing of the sand bed filters. The outflow liquor is assayed for silica continuously, or at frequent intervals as desired, by atomic absorption spectrometry.

The sand bed filters comprise a liquor space, which may include means for liquor distribution, overlaying a ten to twenty or more inches deep particle-size-graded bed, of washed, spent, pellet residue from digestion and quartz pebbles and sand. The bed is size-graded in a manner well known in the art of constructing sand bed filters so as to support the upper filtration surface and effectively prevent passage of any portions of the bed downwardly through the filter. A suitable indirect heat-transfer means, which comprises a suitable heat transfer medium, as for instance condensing steam, inside titanium tubing can be placed within or near the bottom of the graded bed whereby periodically, as required by the need to back wash the sand bed filter, the liquor may be heated to near boiling, in the temperature range of about 118° to 125° C., by injection into the heat transfer tubes of the fluid heat supply medium from a suitable source of supply.

CRYSTALLIZATION

Crystalline aluminum nitrate nonahydrate (ANN) may be produced from the liquor derived from the iron and silica removal steps using standard techniques. For example, the technique described in U.S. Pat. No. 3,804,598 to Royce et al, issued Apr. 16, 1974, and assigned to the same assignee as the instant invention, provides a highly satisfactory method for such crystallization. According to this method, ANN crystals are obtained by providing a slurry of ANN crystals in a substantially saturated solution of aluminum nitrate, introducing aluminum nitrate feed solution into the slurry, and removing from the slurry both ANN crystals and excess water in an amount representing the difference between the overall water input to the slurry and the water required to form nonahydrate crystals having an $Al_2O_3$ content corresponding to the $Al_2O_3$ values contained in the feed solution, thereby maintaining a substantially constant volume of slurry and a uniform rate of separation of purer nonahydrate crystals. Additionally or alternatively, the excess water may be partially eliminated by preconcentrating the aluminum nitrate solution used in preparing the slurry.

According to a preferred embodiment of the present nitric acid extraction process it has been found desirable, for reasons elaborated more fully below, to convert the said purer nonahydrate crystals to infusible, large washable crystals of aluminum mononitrate for feeding to a medium temperature thermal decomposer to be described hereinafter. Thus, according to a preferred embodiment, large washable crystals of basic aluminum nitrate $Al(OH)_2NO_3.2H_2O$ are made continuously by a process comprising the steps of evaporating aluminum nitrate liquor to around 20% $Al_2O_3$ content in a one-pass evaporator, flowing the evaporated liquor through a plug-flow chamber of a size to give a passage time of ½ to 2 hours, and passing said liquor to a plug flow crystallizer while simultaneously injecting a prescribed quantity of water. The crystallizer has a size sufficient to give a passage time upwards of 10 minutes for the magma of crystals and mother liquor.

Subsequently the crystals are separated from the mother liquor in a continuous centrifuge. The crystals are washed with acidified water. Vapors from the single-pass evaporator are preferably condensed in a heat-recovery boiler to produce low-pressure steam or to melt ANN crystals or to evaporate water from dilute aluminum nitrate solutions.

The first description of a process for the production of basic aluminum nitrate that might be suitable for incorporation into a nitric acid-based process for the recovery of aluminum oxide from kaolin was by Thor Mejdell in U.S. Pat. No. 1,413,754 and Canadian Patent No. 224,026. Mejdell's process was improved upon by R. B. Derr and H. P. Stere, U.S. Pat. No. 2,127,504, Aug. 23, 1938. Judging from the paucity of information on this subject since that time, little or nothing has been done either to commercialize or to improve upon the cited developments until the efforts of the instant inventors and their studies which culminated in the inventions to be described herein. From the results of extensive studies we now believe that the cited art has not been commercialized because:

1. The basic aluminum nitrate crystals produced were extremely fine, substantially needles of about 1 micron in diameter by 10 microns long, which are extremely difficult to separate from the mother liquors, and 2. Substantial quantities of water had to be introduced which diluted the acid and required more heat for evaporation.

Other people have made basic aluminum nitrates for various uses as, for instance, Wolkober, British Patent No. 1,184,730, published Mar. 18, 1970, who evaporated some nitric acid and water from crystalline aluminum nitrate nonahydrate and then refluxed the residue for 8 hours to obtain a material that was a good additive to polyvinylchloride; Max Buchner, U.S. Pat. No. 1,792,410, who evaporated aluminum nitrate-containing liquors under vacuum to produce an alumina material and thereby of necessity produced a basic aluminum nitrate material; but these and the like failed to address themselves to the problems of (1) using the preparation step to obtain a purification of the crystals as cited by Mejdell and (2) providing the vapors of nitric acid and water at a temperature and pressure satisfactory for recovering the heat of condensation for reuse at other places in the process. Thus, Wolkober refluxes the material for 8 hours and Buchner does his evaporation under a vacuum.

Mejdell taught the establishment of a pool of aluminum nitrate-containing liquor in a container at atmospheric pressure, or in an autoclave for operation under increased pressure, maintaining the temperature of the pool at between about 140° and 145° C. by the application of heat while simultaneously removing vapors from above the pool and replenishing the liquid in the pool with aluminum nitrate solution and/or steam or water as needed to maintain the temperature of the pool between about 140° and 145° C. An appreciable amount of the alumina precipitated as a crystalline basic aluminum nitrate poor in water. Since the precipitate was crystalline it could be filtered out of the material relatively easily. Further, the concentration of iron in these crystals was substantially less than that in the mother liquor (we have found the same to be true for potash, phosphorous, and a number of other impurity elements) so that the step can be used as a part of the purification operation required to produce the chemically pure alumina demanded by present-day alumina reduction cells. Mejdell's vapors contained no nitrous gases and, since they were present at one atmosphere pressure or higher, could be condensed at temperatures upward of 100° C. in suitable means whereby the heat of condensation could be recovered and recycled to the process. The crystals were especially suitable as feed to the decomposers where alumina was produced by thermally decomposing the basic aluminum nitrate into alumina, nitrous gases and water vapor, because the crystals did not melt or soften or otherwise become sticky and ball up as was the case when efforts were made to decompose aluminum nitrate nonahydrate in the same types of equipment.

Derr and Stere improved upon Mejdell by introducing a step of first evaporating from the molten aluminum nitrate nonahydrate about 30% of the contained nitric acid and water before feeding the residual strong liquor into the steam-heated pool of Mejdell, and by limiting the total evaporation of nitric acid in one pass to about 50% of that contained in the original molten aluminum nitrate nonahydrate. Basic aluminum nitrate crystals were separated for subsequent calcining and the unprecipitated alumina was recycled. Since the first portion of nitric acid was recovered as about 48% by weight nitric acid solution and the second portion can be about a 35% by weight solution, the overall recovered acid concentration was substantially higher than the 16–20% cited by Mejdell. This represents a very substantial savings in dilution over Mejdell and therefore a very substantial potential savings in energy requirements over Mejdell. Indeed, we have found that the use of the heat of condensation recoverable from the vapors so produced would permit a substantial savings in fuel usage for the manufacture of metallurgical grade alumina from kaolin over other processes producing comparable purity alumina without this step.

However, we have found it exceedingly difficult to realize the potential heat recovery aspects of the production of basic aluminum nitrate because of the very small crystals obtained when making basic aluminum nitrate according to the cited prior art. This has been especially true in attempts to practice the process on a continuous basis such as would be needed for a large alumina-from-clay production facility. Crystals produced have been, predominantly, about 1 micron diameter by 10 microns long with some crystals in the area of, for instance, 5 micron diameter by 30 microns long and a relative few approaching a large size of 15 microns diameter by 45 microns long. We have been able to recover these crystals in laboratory batch type centrifuges lined with fine filter cloth but the capital cost and power consumption of this type equipment for the production of, for example, 10,000 tons/day of crystals is impossible to absorb. Consequently, a principal objective of the instant invention is to produce basic aluminum nitrate crystals of such larger size that they can be separated and washed easily on continuous centrifuges of, for instance, pusher or screen bowl types.

1. Feed Materials:

Allowable feed materials can vary quite widely in the percentage of alumina and in the molar ratios of nitrate to aluminum. In a practical sense, for the production of alumina from clay, feed generally will comprise crystals of aluminum nitrate nonahydrate, with a small amount of adhering liquor consisting of aluminum nitrate dissolved in water, which upon melting in the temperature range of about 185°–225° F. provides a liquor with usually at least 13% by weight alumina concentration and preferably within the range of about 13.2–13.5% alumina. Concentrations within the preferred range can be obtained by the use of suitable types of centrifuges for de-liquoring the aluminum nitrate nonahydrate crystals.

2. Evaporation:

Feed liquor must be evaporated to its final desired concentration in a single pass through the evaporator. For batch operation this is accomplished by placing the feed material, either liquid or molten, in a closed reaction vessel and evaporating off a desired weight of nitric acid and water vapors at around 300° F. under autogeneous pressure. For continuous operation evaporation is handled in an evaporator, frequently referred to as a long-tube-vertical (LTV) evaporator, in which the molten feed is pumped into the end of a long titanium or tantalum tube heated on the outside by condensing steam with a condensation temperature within the range of about 350°–450° F. As the liquor is pumped into and through the tube it is first heated to boiling and then partially evaporates in the tube. The material exits from the end of the tube as a mixture of nitric acid vapor, water vapor, and liquid of the desired alumina concentration at a temperature above about 280° F. and preferably within the range of about 300°–325° F. and at a pressure downstream of the tube exit of from atmospheric to 15 or 20 psig as desired. The pressure may be controlled by a pressure controller on the vapor offtake or preferably downstream of the heat-recovery condenser. The selected pressure has very little effect on the production of basic aluminum nitrate crystals but some pressure above atmospheric is desirable to facilitate recovery of the heat of condensation from the nitric acid and water vapors at usefully high temperature. The liquid temperature, however, should be kept above about 285° F., preferably within a range of 300°–325° F. The evaporated liquor should contain upwards of about 16% alumina, preferably 18–22% alumina. The higher concentrations favor the growth of larger crystals, however, as the alumina concentration increases, the viscosity of the liquor increases rapidly so that operation of the equipment becomes more difficult at concentrations upwards of about 22% alumina.

3. Conditioning:

For the growth of large crystals it has been found essential to hold the evaporated liquor in a relatively quiescent state for a time of about 20 minutes to 2 hours before inducing crystallization. For batch production this is accomplished by holding the liquor in the evaporator vessel, within the temperature range of about 270° F. to about 350° F., preferably about 300° F. to about 325° F., for the prescribed length of time with or without gentle agitation provided by a stirrer. The liquors are highly supersaturated and unstable and crystallization of undesirably small crystals will occur in the event of excessive mechanical shock from the stirring or from presumably natural causes if the liquor is held for too long a period of time. For continuous operation, using the long-tube-vertical evaporator described above, conditioning must be carried out under plug flow conditions, as in a long pipe with large length to diameter ratio, so that no small puddle of liquid is allowed to remain in the conditioning chamber beyond the alloted conditioning time. In experiments with 18–20% alumina liquors being conditioned essentially in a stagnant pool with feed into and out of said pool we have invariably obtained undesirable fine crystal formation in the pool after about 2 to 2½ hours. It is obvious therefore, and distinct from the prior art, that continuous production of large crystals cannot be obtained simply by providing a feed inlet and an evaporated liquor outlet to an evaporator vessel and feeding through said vessel continuously while removing the requisite amount of vapors from the evaporator. Liquor transfer into and out of the conditioner also must be accomplished by gentle means to avoid mechanical shock. For instance, our efforts to use piston-type pumps have inevitably resulted in the formation of undesirably small crystals.

4. Crystallization (Water Injection):

The conditioned liquor is transferred into a crystallizer unit designed for plug flow of the magma and immediately is treated with a prescribed proportion of water. Said water may be injected either into the liquor stream or just above the liquor stream, as desired, in an amount calculated in known manner from a mass balance to adjust the composition of the conditioned liquor to a composition expressible as the sum of two components (1) ANN ($Al_2O_3.6HNO_3.15H_2O$ or $Al(NO_3)_3.9H_2O$), and
(2) The desired crystal product BAN or Wiseite (a) BAN ($Al_2O_3.2HNO_3.5H_2O$ or $Al(OH)_2NO_3.2H_2O$)
(b) Wiseite ($Al_2O_3.2HNO_3.4H_2O$ or $Al(OH)_2NO_3.1.5H_2O$).

Mixtures of BAN and Wiseite may be prepared if desired by adjusting the water addition accordingly, and the produuction of BAN is not impaired by the addition of a relatively small excess of water. Crystallization is quite rapid, being substantially complete within about 10–30 minutes. Qualitatively it has appeared to us that either larger crystals precipitate more rapidly or else that conditions that favor rapid crystallization favor the production of large crystals. Thus we prefer to have high levels of supersaturation, that is, high alumina concentration in the evaporated liquor, as it enters the crystallization chamber and temperatures above about 285° F., preferably in the range of about 300° to 325° F. As stated previously, a practical limit is placed on the maximum concentration by handling problems arising from the high viscosities of the liquors. In the crystallizer it is possible also to generate a solids concentration so high that subsequent handling of the magma is difficult. We prefer to keep the solids concentration under about 50% to avoid excessive difficulties in subsequent handling of the magma. Crystals of BAN as large as 200 microns long by 75 to 100 microns wide have been produced. We have not been able to produce Wiseite crystals as large as BAN crystals. However, the Wiseite crystals are of useful size and much larger than either the BAN or Wiseite crystals produced by the old technology. Under the optical microscope both BAN and Wiseite crystals look substantially alike but they are readily distinguished one from the other by their x-ray patterns. It is difficult experimentally to obtain BAN totally free of Wiseite because BAN will convert to Wiseite, with loss of water, when heated in air at temperatures above about 175° F. However, the initial crystal size obtained is not significantly altered by this conversion.

5. Separation of Crystals and Washing:

The large crystals of BAN or Wiseite produced in the method described above are readily separated from the residual liquor by various known methods of liquid-solids separation. Since the concentration of most of the trace elements that are undesirable in the final alumina product are much lower in the crystals than in the liquor, a substantially greater purification of the final alumina can be achieved if the adhering mother liquor is washed off. The adhering mother liquor may be removed readily by washing with aluminum nitrate solutions or preferably with water containing about 1 to 5 weight percent nitric acid. Pure water provides a very poor wash because some of the crystals appear to hydrolize to produce a gel-like scum which quickly renders the surface essentially impervious to the ingress of water into the bulk of the cake, preventing effective washing. This film does not form when properly acidified wash solution is used and excellent washing can be obtained. A small portion of the crystals are dissolved during the wash, the amount being somewhat dependent on washing time so that it is desirable to pull or push the wash liquors through the cake rapidly. In the presence of water particularly, large crystals observed under the optical microscope appeared to exfoliate at their ends into the previously described about 1 micron diameter needles and the ends of the large crystals take on the appearance of a broom. As stated by Mejdell and by Derr and Stere, since the washed crystals are infusible, hence do not dissolve or melt on heating, they are especially suitable for feed to thermal decomposers wherein they decompose to alumina and to $NO_x$, $O_2$, and water vapor that can be converted easily into nitric acid solution. The washed crystals are further decomposed in a medium temperature and a high temperature decomposer described hereinafter.

6. Mother Liquor Recycle:

The wash liquor produced in (5) and a part if desired of the crystal mother liquor, which carry a substantial portion of the aforesaid undesirable trace elements, may be recycled to an aluminum nitrate nonahydrate crystallization step for further purification and recovery of alumina values for recycle. The remainder of the mother liquor may be recycled to mix with molten aluminum nitrate nonahydrate in the feed tank to the evaporator. The amount of mother liquor, which may contain some BAN crystals that escape the filter, that is recycled for mixing with the molten aluminum nitrate nonahydrate in the evaporator feed tanks should not exceed an amount which may carry sufficient crystals as to cause premature crystallization in the said conditioning chamber. We have obtained satisfactory results after adding some crystals to the molten aluminum nitrate nonahydrate. Satisfactory results can be obtained (with recycle of mother liquor containing BAN or Wiseite crystals) if the combined alumina concentration of the mixture in the evaporator feed tank, held at about 225° to 375° F., does not exceed about 15%–15½% alumina. However, if a mixture of crystals and mother liquor is heated to about 400°–450° F., 50–60 psig autogenous pressure, dissolved alumina concentrations up to 20% or more can be obtained which, after cooling to around 285° to 325° F. and conditioning, produce very large crystals upon the initiation of crystallization. Small crystals thereby can be converted into large crystals, however, it is economically more favorable to produce the large crystals directly.

Decomposition

There are a number of patents and publications relating to the decomposition of aluminum nitrate. In U.S. Pat. No. 1,702,410 (Feb. 10, 1931) to Max Buchner, it is stated (p. 3, line 75-83)—"The decomposition of aluminum nitrate may be effected by heating it in the solid, crystallized or dissolved state, or in the state in which it occurs after the last step in the process, if desired, with the introduction of gases, or of water or steam. In this way nitric acid of any desired concentration can be produced." The patent goes on to say (p. 3, line 102-10-5)—"In this way about 92% of the nitric acid in the aluminum nitrate can be recovered, therefore, nitrous gases are formed only in small quantity."

U.S. Pat. No. 2,737,445, issued Mar. 6, 1956 in the name of Ernest Samuel Nossen describes a process for the thermal decomposition of metal nitrates including aluminum nitrate. The process involves the addition of steam (and other gases) to form nitric acid vapors for recovery of nitric acid in liquid form. In this patent, the starting material could be either solid or aqueous metal nitrate.

Other patents and publications describing the decomposition of metal nitrates are German Pat. No. 556,882, issued to Dr. Fritz Gewecke on Aug. 15, 1932 and two articles by this same Dr. Gewecke, one in Die Chemical Fabrik No. 21–22, pp. 199–209 (1934), the other in Chemiker-Zeitung, No. 15, pp. 157–58 (1936). The Gewecke patent and publications disclose the complete thermal decomposition of aluminum nitrate by (a) heating the metal nitrate in the form of a thin film to a temperature higher than the temperature of its decomposition, (b) in the presence of steam to obtain a solid product and substantially complete recovery of all nitric acid.

Several publications by the Atomic Energy Commission describe the practice of decomposition of aluminum nitrate. These publications also describe in considerable detail equipment used in such decomposition. Among the publications of interest are the following by the Atomic Energy Division of Phillips Petroleum Company, Idaho Falls, Idaho: "Pneumatic Atomizing Nozzles in Fluidized Bed Calcining, Part I—Calibration Tests" by Legler and Stevens, IDO-14548, TID-4500, Ed. 16, and "Pneumatic Atomizing Nozzles in Fluidized Bed Calcining, Part II—Process Tests" by Legler and Brown, IDO-14631, TID-4500 (31st Edition), issued July 1964. The latter report describes decomposition tests of aluminum nitrate waste solutions in a fluidized bed calciner with considerable description of feed nozzle selection and operation. Particle size control is discussed in detail. Similar information is reported by Legler in an article published in "Chemical Engineering Progress" in February 1967 titled "Feed Injection for Heated Fluidized Beds." Earlier, Cooper and Black of Phillips Petroleum, Idaho Falls, Idaho, had published "Pilot—Plant—Scale Fluidized Bed Calciners," CEP (Vol. 61, No. 7, July 1965). The kinetics of particle growth in fluidized bed calcination of aluminum nitrate solutions (radioactive waste liquor from nuclear fuel reprocessing) was investigated by Lee et al. in "Kinetics of Particle Growth in A Fluidized Calciner," AIChE Journal, Vol. 8, No. 1, March 1962, pp. 53–58. The AEC publications referenced earlier give various references to earlier work at Idaho, the earliest cited being—Grimet, E. S. "Calcination of Aluminum-Type Reactor Fuel Wastes in a Fluidized Bed," IDO-14416, August 1957. U.S. Pat. No. 3,869,543 (Mar. 4, 1975), and U.S. Pat. No. 3,898,043 (Aug. 5, 1975) in the names of Schutte and Stevens, assigned to Arthur D. Little, Inc. describes a method and apparatus, respectively, for decomposition of aqueous aluminum nitrate solution to form an alumina product and nitric acid. The apparatus described is a conventional fluidized bed design with indirect heating coils. One notable feature of the heating tubes described in the patent is their U-tube arrangement in the fluidized bed design with indirect heating coils. Such an arrangement would be impractical for using a condensing heat transfer fluid, such as steam, due to difficulty in withdrawing the condensate.

The A. D. Little U.S. Pat. No. 3,869,543 describes aluminum nitrate decomposition in a method using at least two separate beds of fluidized particles and fluidizing the bed particles of one of the beds with steam, while using the off-gases effluent from one bed fluidized with steam as the fluidizing gas for the remaining beds. There is also described the separation of off gases into nitric acid and water vapor containing noncondensable oxides of nitrogen and the subsequent condensing of the water vapor thereby removing the oxides of nitrogen. There is no mention of recovering of the heat of condensation from the condensing of nitric acid and water vapor. In U.S. Pat. No. 3,898,043, the production of a material presenting no handling problems is stated as an objective. The patent discusses problems reported in the prior art of handling a sticky, glue-like material formed during the hydrolysis process. The A. D. Little patent purports to resolve this problem by an improved decomposition process. The A. D. Little patent admits to prior patents using steam for hydrolysis to recover substantially all the nitrate values from decomposition as nitric acid, but states that the problems of the prior art are overcome (col. 3, line 2. U.S. Pat. No. 3,898,043). This is supposedly done by feeding an aluminum nitrate solution corresponding to the composition of melted $AL(NO_3)_3.9H_2O$ crystals into a fluidized bed, which is maintained at a temperature between about 150° and 210° C.

A number of publications exist relating to fluidized bed design and operation. Of particular interest are those by F. A. Zenz, such as "How Flow Phenomena Affect Design of Fluidized Beds," Chemical Engineering, Dec. 19, 1977, pp. 81–91. In this article, Dr. Zenz teaches the concept of jet penetration into particle beds as the critical consideration in preventing scale formation on the nozzle and providing adequate atomization.

In the method described herein for decomposing molten ANN, heat of condensation from an evaporator and a low temperature decomposition stage is recovered and used in various parts of the alumina extraction process, particularly in the aluminum nitrate nonahydrate purification process. Plant energy consumption is minimized by using off-gas vapor from the decomposer as fluidizing gas as per Canadian Patent No. 906,735 to Markey (8/8/72). Steam is not used except, possibly, during start-up. This concept differs from that of A. D. Little in that in the A. D. Little method steam is added to at least the first decomposer. The addition of steam imposes an energy penalty due to the additional plant evaporation load to remove the steam and is not necessary.

In the method described herein, the naturally occurring concentration of water vapor in the first stage decomposer, upwards of 70 volume %, has been found to be sufficient to promote hydrolysis to nitric acid and retard the formation of noncondensable $NO_X$ gases from nitric acid.

Method

A preferred embodiment of the method described herein for the decomposition of aluminum nitrate to alumina, nitric acid, and various gases including $NO_X$, $H_2O$, and $O_2$ involves feeding to the decomposition process washed aluminum nitrate nonahydrate ($Al(NO_3)_3.9H_2O$) crystals and adhering wash liquor obtained in the purification step as described in U.S. Pat. No. 3,804,598. The feed crystals and adhering wash liquor are sent to a melting step where the crystals are melted and the resulting feed solution is preheated before feeding to an evaporative step. The objective of the evaporative step is to provide as much evaporation as possible while producing a feed liquor to a low temperature decomposer that is sufficiently fluid to feed through the nozzle means into the fluidized bed.

The preliminary removal of $HNO_3$ and $H_2O$ by evaporation is more economical in an evaporator than in a decomposer due to a higher overall heat transfer coefficient in an evaporator. Thus, economics favor removal of as much vapor as is practical in the evaporative step. Alternatively, however, the low temperature decomposer may be fed directly with aluminum nitrate nonahydrate melt, or diluted melt, if desired, or other aluminum nitrate containing streams, such as impurity purge streams produced during preparation of the purified ANN or BAN crystals.

The evaporator is preferably a long-tube, once-through evaporator, primarily because of its economic advantages. The long tube evaporator comprises a cylindrical closed-end shell supplied with steam through which relatively long heat-exchanger tubes extend. Liquor flows once through the tubes entering at one end and discharging at the other as a mixture of liquid and vapor. Preferably, the tubes are sufficiently long to provide adequate pressure drop to insure an even distribution of feed liquor through the tubes. A vapor header and/or vapor-liquid separators separate the vapor from concentrated liquid. The concentrated liquid is removed from the evaporator and is not recycled. Vapor is routed to a suitable process heat recovery condenser.

The liquor is quickly evaporated to the desired concentration and precipitation of hydrated basic aluminum nitrates is normally avoided. Solution concentrations of 20% to 22% $Al_2O_3$, or even higher if desired, can be achieved in the long-tube, once-through evaporator. This can be accomplished also in a recirculating evaporator operating at 400°–450° F. However, we have found that at more practicable operating temperatures and resultant pressures, basic aluminum nitrates precipitate in a recirculating evaporator at liquor concentrations upwards of about 16% $Al_2O_3$ and that the resultant vapors have undesirably lowered $HNO_3$ concentrations than vapors produced as described above.

Various heat transfer media may be used on the shell side of the evaporator to supply heat. The heat flows through the tube walls to the liquor. Steam is the conventionally used fluid, although in this method a heat transfer medium flowing counter currently from a decomposition stage may also be used. It is within the existing art to design and operate a suitable once-through evaporator and select a suitable heat transfer medium to accomplish the concentration of the aluminum nitrate liquor in the evaporative step. The aluminum nitrate solution feeding the evaporator, which is obtained by melting $AL(NO_3)_3.9H_2O$ crystals and adhering wash liquor, is in a concentration range of about 13 to 13.5 $Al_2O_3$. The evaporator vapor concentration is in the range of about 45 to 55% $HNO_3$ (by weight). The evaporator vapor head operating pressure is in the range of about 10–20 psig or even higher if desired, with a corresponding temperature range of about 300° F. to 350° F. Preferably, the autogenous vapor pressure of the evaporator is sufficient to push evaporator discharge liquor through the decomposer feed nozzle without the need of a pump. A feed pump may be used, however, if required, but sufficient net positive suction head must be provided. Precautions must also be taken to prevent freezing of the concentrated aluminum nitrate solution in the pipe or pump. Insulation normally provides such protection.

The evaporator vapor consists essentially of condensable nitric acid and water vapor with only minimal non-condensables, such as air dissolved in the feed. The heat of condensation of this vapor is recovered in a condenser on the melter, which melts the evaporator feed, and/or in various other heat sinks in the process. The heat of condensation and any sensible heat due to cooling of superheated vapor or subcooling of condensate is transferred through the tubes to the melting crystals and adhering mother liquor or to the melt. It is within the state of the art to properly design and operate appropriate condensing systems to recover heat to the process at various suitable locations.

The objective of the low temperature decomposer is to remove HNO₃ from the concentrated feed solution such that the evolved vapor will be condensable to aqueous nitric acid at elevated temperature with a minimum of noncondensable vapors present in order to maximize heat recovery into the process streams while simultaneously producing infusible basic aluminum nitrate solids. This objective is accomplished by feeding the evaporator discharge to a decomposer, preferably a fluidized bed design, controlled in a temperature range of 150° C. to 200° C. with a preferred operating temperature of about 170° C.–190° C. At temperatures above about 195° C. undesirable amounts of $NO_X$ gases begin to form, the presence of which increases the difficulty of condensation in the heat recovery means. It is thought that the $NO_X$ gases are formed when the decomposition is allowed to proceed much beyond the aluminum mononitrate composition.

The fluidized bed may be a conventional design with a chamber, usually cylindrical, containing a fluidized bed of particles and a vapor disengaging section at the top. A gas distribution plate with tuyeres or pipe with downward facing holes is mounted horizontally, near the bottom of the decomposer as is common practice in design of a fluidizing bed. Fluidizing gas is admitted through this distribution plate. Fluidizing gas is provided by recycled vapor from the first stage decomposer. Liquor from the evaporator is fed to the fluidized bed under pressure through a nozzle or nozzles mounted usually in the side chamber below the level of the fluidized bed.

It is known in the art to design and operate nozzles for introducing feed liquor to a fluidized bed in a manner to reduce the formation of scale deposits on the nozzles. The publications of the Atomic Energy Commission cited hereinabove detailed descriptions of nozzles used in their installations. Based on tests of various nozzle types, The AEC selected a pneumatic atomizing nozzle of the two-fluid, external-mixing type for introducing feed to their fluidized bed calciner. (IDO)-14631, p.2).

Zenz ("Bubble Formation and Grid Design," I. Chem. E. Symposium Series No. 30, 1968: Instn. Chemical Engineers, London, P. 3–8) discusses the importance of penetration into the fluidized bed for atomizing gas and liquid feed in providing a properly atomized feed that will minimize scaling and presents mathematical relations which may be used for design. Penetration depth is a function of the velocity and density of the fluid through the nozzle, and the Zenz reference gives quantitative correlations for this relationship. Atomizing gas for the nozzle is supplied by vapor from the first stage decomposer. Steam or air may also be used for atomizing fluid, particularly for start-up.

Heat is supplied to the fluidized bed indirectly through heat transfer tubes, preferably finned, mounted in the bed with one of various possible heat transfer media circulating inside the tubes, such as steam, molten salt, NAK, or aromatic mineral oils such as Dowtherm. A furnace fired by an acceptable fuel is used to provide heat to the medium. The medium is caused to circulate through heating means wherein it absorbs heat and then through the tubes of the fluid bed and back to the heating means.

Alternatively, the heat transfer medium circulating through the second stage decomposer may be used to circulate through the first stage heat transfer tubes after it leaves the second stage. The particular alternate selected will depend on a heat balance and economics of the total system. It is within the state of the art to design such a heating system to minimize energy consumption, while providing the heat required to achieve the desired decomposition and temperature level.

If steam is used as the heat transfer medium, then a preferred arrangement of the heat transfer tubes within the fluidized bed is a vertical configuration with steam entering at the top and condensate leaving at the bottom. The U.S. Atomic Energy Commission (publications cited above) used horizontal bayonet type heaters with NAK as the heat transfer medium. The A.D. Little patents discussed above show vertical U-tube arrangements of the heat transfer tubes, which would be satisfactory for single phase media but not for condensing media, such as steam. Condensate removal would be a problem in the latter case. In an experimental fluidized bed, we have successfully employed a vertical tube assembly with steam introduced at the top and condensate withdrawn through a trap at the bottom.

The heat input is controlled to maintain a temperature that will insure a sufficiently low level of noncondensables in the vapor. An acceptable noncondensable level can be judged by the heat transfer coefficient in the heat recovery device. The lower the noncondensable level, the higher will be the heat transfer coefficient. Maximizing the heat transfer coefficient will maximize heat recovery, which is a major objective of the first stage decomposer. As mentioned previously, the preferred control temperature is about 175° C.–195° C. The volumetric percent of water vapor in the first stage decomposer off-gas resulting from stoichiometry of the decomposition during proper operation is in the range of about 65 to 75 percent. This concentration of water is considerably above that indicated in the A. D. Little patents as necessary to provide sufficient hydrolysis to promote formation of condensable nitric acid vapor and suppress noncondensable $NO_X$ gas formation. Addition of steam at this stage is redundant; it merely dilutes the acid resulting in a penalty in energy to evaporate the water therefrom. Steam or air may be used as fluidizing gas during start-up but it is replaced as soon as practical by recycled decomposer vapor.

Vapors from the first stage decomposer are condensed, and the heat of condensation is recovered to provide heat to various heat sinks in the process, particularly in the aluminum nitrate nonahydrate purification step. Any noncondensables that may be present are sent to an acid reconstitution area described hereinafter.

Figure 4:
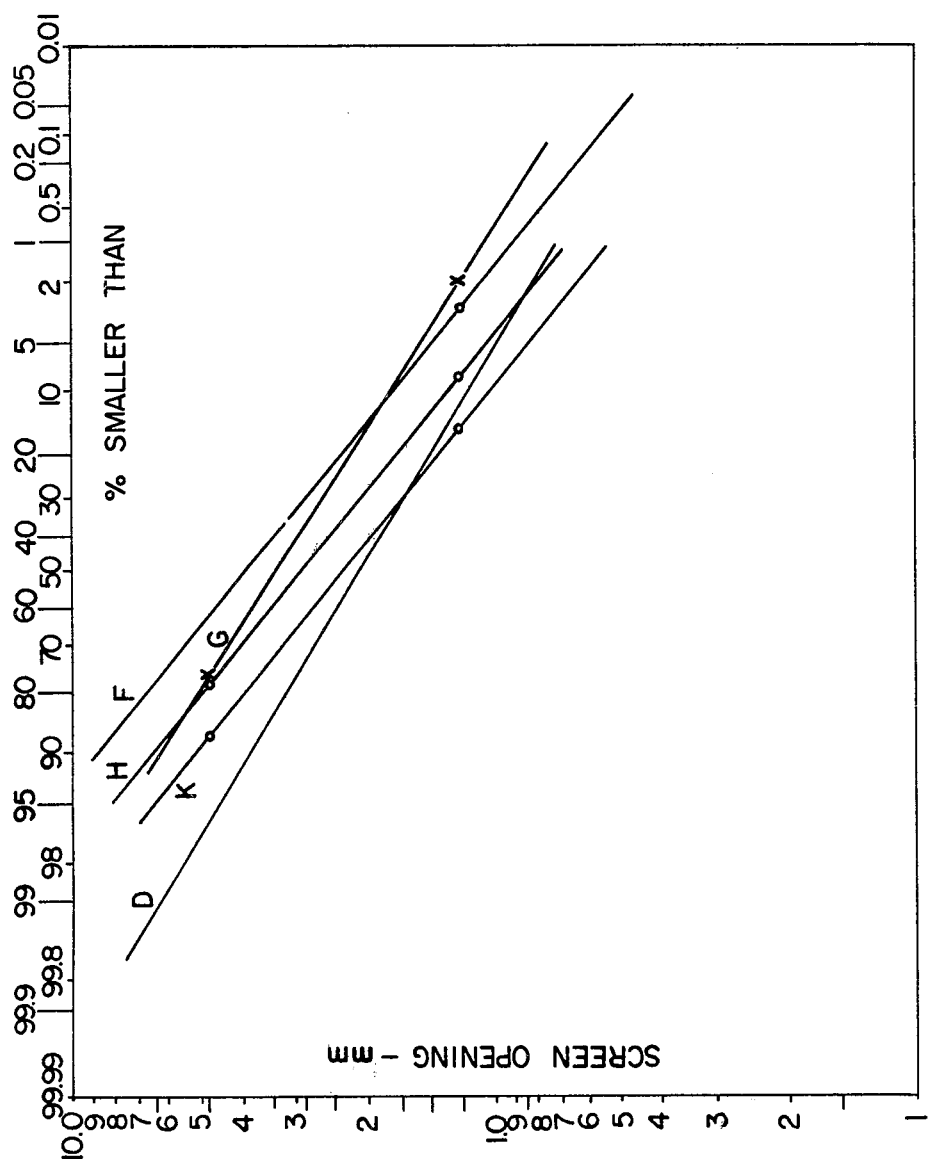

Particle size control in fluidization beds is discussed in some detail in the publication by the AEC previously cited. The significant variables in particle size control are nozzle gas-to-feed volumetric ratio, bed operating temperature, fluidizing gas velocity and feed solution concentration. The rate of elutriation of fines at a given temperature usually increases as nozzle atomizing gas-to-liquid feed ratio increases. ("Feed Injection for Heated Fluidized Beds," by B. M. Legler, loc. cit. FIG. 4, p. 77). The recovered portion of these fines is recycled to the bed, and if additional fines are needed to provide sufficient seed particles to maintain particle size control, they can be provided by recycling controlled amounts of dust recovered from off-gases of the medium and high temperature decomposers described hereinafter. Many methods of generating fines within or outside the bed are known in the art. The overall heat transfer coefficient from the heating tubes to the fluidized bed primarily depends on the mass median particle diameter and the superficial fluidizing gas velocity. At a fixed fluidizing gas velocity, the heat transfer rate increases with a decrease in the particle size.

Spray drying per se is not desired in the fluidized bed calcination process because the resulting small, low-density particles are subject to rapid elutriation. Spray drying is deliberately minimized by maintaining the fluidized bed level high enough to ensure submergence of the spray zone within the bed of moving particles. Thus, the particles grow within the bed by accretion of thin layers of liquid as they pass through the spray zone which then partially decompose at bed temperature leaving a residue which adds to the particle volume. The basic aluminum nitrate particles thereby produced are excellent for feed to the medium and high temperature decomposers, especially since, as described hereinbefore for the large basic aluminum nitrate crystals, they are infusible and do not melt or dissolve on heating.

The fluidized bed decomposer is equipped with a dust collection system, preferably a cyclone, and collected dust is returned to the fluidized bed. Any uncollected dust accompanies the off-gas to the heat recovery unit, wherein it dissolves in the condensed acid.

As used herein, high temperature refers to a temperature of between about 1000° F. and 1500° F., medium temperature to a temperature of between about 600° F. and about 750° F. and low temperature to a temperature of between about 300° and about 400° F.

The primary objective of the second and third stage decomposers is to remove most of the remaining nitrate from the solid particles discharging the first stage decomposers. Although this further decomposition may be accomplished in a single unit, the preferred method is to divide the operation into medium and high temperature steps to minimize energy consumption and reduce equipment size. The preferred embodiment employs fluidized bed decomposers in a single vertical shell with characteristics as described previously for the low temperature stage fluidized bed decomposers. In the preferred embodiment, fluidizing gas passes countercurrently from the third (high temperature) stage to the second (medium temperature) stage. Fluidizing gas for the high temperature stage is provided by recycling a portion of the off-gas from the medium temperature stage decomposer. Vapor from the medium temperature stage that is not required for fluidization in the high temperature stage is routed to a sensible heat recovery unit, such as a waste heat boiler, and then to the acid reconstitution process. Alternatively, off-gas from either the second stage or the third stage may be recycled on itself to provide fluidizing gas. The remaining off-gases from the stages are routed to a sensible heat recovery unit, such as a waste heat boiler, and then to acid reconstitution. During the start-up steam or air may be used for fluidizing gas.

Solid particles pass from the second stage decomposer to the third stage decomposer and then to the calciner. There are several methods within the existing art to transport solids, including gravity, pneumatic, and mechanical. The preferred method is gravity overflow of solids from the first to the second stage, second to third stage and third to calciner. An air lock device such as a rotary air lock may be necessary to prevent bypassing of fluidizing gases through the solids transport line. Alternatively, screw conveyors and screw feeders may be used with appropriate air lock devices. Drag conveyors or inclined screw conveyors may be required if space limitations prevent gravity feeding. In order to minimize the possibility of alpha alumina formation, it is desirable to minimize the residence time of the solid particles in the fluidized bed. Alpha alumina production in the second or third stage decomposer is undesirable, because it is virtually insoluble in nitric acid. Consequently, a solids trap would have to be provided in the reconstitution process to intercept dust particles of alpha alumina escaping the dust collection system on the second or third stage decomposers. In addition, alpha alumina tends to erode the equipment.

Residence times of less than an hour in the decomposers can permit the necessary transfer of heat to the solid particles for the desired decomposition. Preferably, the second stage decomposer residence time will be less than about 4 hours, and the third stage residence time will be 2 hours or less, as determined by the bed volume required to incorporate the needed heat transfer surfaces. It is known to use extended surface, i.e., finned, tubes with 1 to 2 inch clearance between tubes in a bed with relatively large length to diameter ratio whereby the heat transfer surface per unit of volume is maximized with resultant minimizing of solids hold-up time and whereby the bed cross-section area is minimized to reduce the amount of recycled gases and energy required to maintain fluidization.

The second stage fluidized bed decomposer is operated within a temperature range of about 600° F. to 750° F. to reduce the residual nitrate concentration in the solid product to 5 to 10 weight percent $NO_3$.

The third stage decomposer operates in the range of 1000° F. to 1300° F. to reduce the residual nitrate in the solid product to less than 2 percent. The primary components of the second and third stage decomposer vapors are $H_2O$ upwards of about 50 volume %, and $NO$, $NO_2$ and $O_2$ in concentrations approaching equilibrium at the operating temperature.

Preferably, heat is supplied to the second and third stage decomposers indirectly in a manner similar to the method of the first stage decomposer. An appropriate heat transfer medium, such as molten salt or NaK, circulates through heat transfer tubes, preferably finned, mounted within the fluidized bed. In a preferred embodiment, the heat transfer fluid circulates countercurrently, passing first into the third stage decomposer and then into the second stage, before returning to the furnace to be heated. This countercurrent method is used to achieve optimum heat economy. Additional heat transfer fluid is added directly to the second stage circulation system, if required. Alternatively, if the heat balance indicates it is possible and economical, the heat transfer fluid may also be circulated from the second stage to the first stage and then back to the furnace for reheating. The heat transfer fluid itself is heated in a furnace or furnaces fired by an appropriate economical fuel such as coal and caused to circulate as described hereinabove.

If NaK is used as the heat transfer medium a portion of it must be cooled and filtered to remove sodium oxides. The cooling may be done by circulating NaK through the first stage decomposer, the evaporator, or other appropriate heat sinks. The particular method used will depend on process requirements and economics.

Although fluidized beds are preferred for the second and third stage decomposers, other types of calciners may be used. Indirect heat exchange is required however, so that the off-gas will be reconstitutable to nitric acid in economical manner. Selection of particular decomposition equipment will depend on process economics.

The final calcination step is designed to removal the residual nitrates and substantially all of the residual water from the solid product to give a metallurgical, chemical or refractory grade to alumina. The calcination may be performed in a fluidized bed or other type of calciner such as a rotary. The preferred embodiment is a fluidized bed calciner. The calcination is performed in a temperature range of 1900° F. to 2200°0 F. Heat is supplied directly by combustion of a clean fuel, such as natural gas or a suitable fuel oil. A clean fuel must be used in the calcination step to prevent contamination of the alumina. It is well within the known art to design and operate an effective, economical calcination process to achieve a desired grade of alumina.

Also well known in the art is the method of operating the calciner with a slightly rich mixture of fuel to produce a reducing atmosphere, which reacts with the possible $NO_X$ gases to convert them to harmless $N_2$. Air is subsequently added ahead of the waste heat boiler through which the off gasses pass for heat recovery to burn any uncombusted fuel.

The waste heat boiler is equipped with appropriate pollution control equipment for removing alumina dust. Additional $NO_X$ control equipment may be added if desired, but the various published references on control of $NO_X$ in stationary fired equipment indicate that no further treatment will be necessary if the system is designed and operated properly.

The decomposition method thus is begun by melting Aluminum Nitrate Nonahydrate crystals prepared in the fractional crystallization of ANN (U.S. Pat. No. 3,804,5980) and comprising an equivalent concentration of alumina, usually of around 13 to 13.5 weight percent. The melting is preferably performed with heat supplied from the heat of condensation of nitric acid vapors. The melted nitrate is pumped at a controlled rate into an evaporator, which includes vapor-liquid separation means, of a particularly preferred type, commonly referred to as a long tube vertical evaporator. In pssage through the evaporator the liquid is warmed to boiling and then partially evaporated within the tube to yield, after separation in the separator, a liquor comprising about 18 to 22% alumina concentration at a temperature generally within the range of about 300° to 350° F.; and a resultant vapor phase with a nitric acid concentration within the range of about 48 to 52% $HNO_3$ at a superastmospheric pressure. The pressure may be selected as desired and controlled within the range of about 5 to 30 psig, or higher if desired. The vapor is condensable at elevated temperatures to nitric acid solutions as is required for recovery of the heat of condensation for supply to the melter or to other similar type equipment with the plant or if desired for the generation of low pressure steam. The concentrated liquor is pushed by the pressure developed in the evaporator through a suitable conductance means and through a suitable nozzle into the bed of a fluidized bed reactor means wherein the temperature of the bed is maintained at about 300° to about 400° F. by indirect transfer of heat from a suitable fluid heat supply means, as for instance steam or NaK, and wherein the fluidizing bed particles, comprising partially decomposed aluminum nitrate material, grow by accretion of thin layers of the said liquid which in turn partially decompose to the composition of the said bed particles with formation of a vapor phase comprising nitric acid and water. A portion of the vapor phase is condensed externally of the reactor, at elevated temperature, to recover, as useful heat, the heat of condensation thereof and a second portion is compressed by a suitable compressor means with suitable interstage coolerrs as may be required to prevent the temperature of the vapors from exceeding about 500° F., preferably 450° F. The compressed vapors are returned to the fluidized bed to supply the required fluidization gas and any atomizing gas that may be required by the spray nozzles. In this manner, no extraneous gases, as for instance air or steam, need be supplied to the unit during normal operation. The operating temperature range within the range of about 300° to 400° F. and which in fluid beds is easily controlled to within 10° or 15° F., is selected to minimize the production of non-condensable gases, $NO_2$ and $O_2$, that may be produced if the decomposition of the partially decomposed aluminum nitrate material of the bed is allowed to proceed to too great an extent, as may occur by cooperative action of too high a bed temperature with long residence times of the solids within the bed. The condition of the gases is judged by monitoring, in manner well known to the art, the heat-transfer coefficient of the heat-of-condensation-recovery means, which in known manner will decrease as the concentration of noncondensable gases increases. If the heat transfer coefficient is found to be lower than the design value, the temperature of the bed is lowered, in 5° to 10° F. increments, until the heat transfer coefficient has regained its desired value. The bed temperature, however, is maintained at the highest temperature level that yields a proper heat transfer coefficient to provide a sufficient rate of decomposition of the liquid layer on the particles to solid material, whereby the tendency of the particles to stick to one another is minimized.

It is claimed in the art that 90% or even 95% of the nitrate values contained in ANN can be separated from the alumina in a fluid bed operating around 400° F. and, if the off gases comprise a substantial amount of $H_2O$ vapor, the major portion of the nitrate values in the gases can be obtained as nitric acid when the gases are condensed at unspecified temperatures. FIGS. 7 and 8 of U.S. Pat. No. 3,896,543 presumably indicate low conversions of the input $HNO_3$ values to non-condensible $NO_X$ gases. It is well known in the art, however, that when gases containing $NO_2$ and water vapor are condensed at low temperatures, below 150° F. or so, two-thirds of the $NO_2$ can reconstitute to $HNO_3$ so rapidly that the reconstitution reaction may be confused with the direct condensation of $HNO_3$ (or of the anhydride $N_2O_5$). This does not occur at temperatures near the atmospheric or higher-pressure boiling temperatures of the nitric acid solutions, which exceed about 240° F. Thus, the operability of a condensor recovering the heat of condensation of the vapors for reuse in the process may be quite different from that of a condensor operating at temperatures too low for efficient reuse of the heat of condensation.

As the volume of the partially-decomposed material in the bed increases, the excess is conveyed by known means to a second indirectly-heated decomposer, which may be a rotary kiln but preferably is a fluidized bed, which is preferred because of the high heat transfer coefficients obtained therein, operating at a temperature upwards of about 600° F. and preferably within a range of about 650° to 750° F. at which temperatures further decomposition of the partially-decomposed aluminum nitrate material proceeds to a nitrate composition of within a range of about 5 to 10 weight percent, at convenient solid residence times in the bed of about 1 to about 4 hours, with the production of nitrous gases consisting essentially of NO, $NO_2$, $O_2$ and $H_2O$. A portion of the nitrogen gases exiting the bed is compressed in suitable compressor means and returned to provide the fluidizing medium of the bed and the remainder is passed to the nitric acid reconstitution system through suitable means which may include for means for recovering a portion of the sensible heat contained therein. Higher decomposer temperatures and long residence times than the stated preferred ranges may be employed if desired. However, increase of the residence time beyond that dictated by best design of the indirect-heat-transfer means requires the recirculation of larger portions of the off-gases with attendant increased power consumption. Also, we have found that the degree of decomposition of the partially-decomposed solid aluminum nitrate material is relatively unaffected by temperature within the range of about 700° to about 1000° F. We prefer therefore to operate the bed at the lowest practical temperature that permits attainment of the aforesaid 5 to 10% nitrate concentration of the decomposed materials at minimum practical solids residence times, which temperature does not exceed 750° F.

Excess bed volume accumulating in the second decomposer, by virtue of the continuous feed from the first decomposer, is fed in known manner to a third indirectly-heated decomposer, preferably a fluid bed for reasons stated above, in which preferably the fluidized bed is maintained, by virtue of the indirect heat transfer, at bed temperatures above about 1000° F. and preferably within the range of about 1250° to 1400° F. The degree of decomposition which can be achieved in reasonable solid residence times of say 1 to 2 hours, as measured either by the residual nitrate content of the decomposed material or by the loss-on-ignition at 1200° C., depends both upon the temperature and upon the rate at which the temperature is attained. A test subjecting the second decomposer product to rapid heat-up rates approaching those attainable by injecting solids into a fluid bed yielded residual nitrate contents of about 3½ to 5% and LOI values of 5 to 8% at temperatures within the range of about 1000° to 1150° F., residual nitrate values of less than 1% and LOI values of 3 to 5% at about 1300° F., and nitrate values near zero by about 1500° F. It was also observed that at the cited nominal retention times little or none of the alumina value is converted to the alpha crystal modification. Although an amount of alpha alumina is desired in the final metallurgical grade alumina, it is not desired in the decomposers because the alpha modification is highly abrasive, and is also subject to autogenous grinding in the beds with attendant production of excessive fine materials which must be removed from the gaseous effluent. The substantial importance of residence time is indicated by the experience with the fluid bed aluminum nitrate decomposer of the AEC wherein, at bed temperature of about 750° F. but with solids hold up times of the order of 50 hours, nitrate concentrations as low as 3% have been obtained with the simultaneous production of substantial amounts of the alpha alumina modification. Dust formation was so severe that boron compounds had to be added to the feed to the bed to suppress the alpha alumina formation.

It is known to incorporate the said second and third fluidized beds into a single shell with the second bed elevated above the third bed and to supply at least a portion of the fluidizing gases required in the second bed with off-gases from the third bed. It is also known to combine the two functions of the second and third beds into a single indirect-heated rotary calciner wherein bed temperatures increase continuously from the feed end to within the aforesaid 1000° F. to 1350° F. temperature range at the product discharge end. Since as aforesaid the attainable heat transfer-coefficients to the beds in rotary units are much lower than those attainable in fluidized beds a great deal more expensive equipment must be provided, and radiation and convection heat losses, i.e. wasted heat, will be larger.

The decomposed product of the third fluidized bed, preferably containing less than 1% nitrate, is moved by known means to a final direct-fired calcination means and exposed to temperatures upwards of about 1850° F., depending upon the permissable final water content, to complete the conversion to metallurgical grade alumina. To prevent atmospheric contamination with $NO_X$ the calciner is operated at slightly less than stoichiometric air-to-fuel ratio to reduce the $NO_X$ to $N_2$, and any unburned fuel is subsequently oxidized with excess air at lower temperatures in a waste-heat boiler, a method of operation that is well known in the art of operating stationary fired furnaces and boilers.

Methods for designing fluidized beds with low solids residence times are well known in the art.

These comprise:

1. The use of extended-surface (finned) heat-transfer tubes.

2. Use of minimum clearance, about 1 to 3 inches, between the tubes in the bundle.

Experimental data on items 1 and 2 particularly are presented in "Heat Transfer From Horizontal Tube Bundles to Air-Fluidized Beds" by Petrie, Freely and Buckham presented at the 60th annual A. I. Ch. E. meeting November 26–30, 1967 at New York, N.Y.

3. Use of large length-to-diameter ratios for the bed, which is facilitated by the heat-transfer internals.

Nitric Acid Recovery/Reconstitution

Finally in order to provide an economically useful nitric acid extraction process for alumina, the nitric acid must be recovered from the total process in sufficient quantity as to provide a high percentage of acid recirculation. As described in the foregoing paragraphs, substantial nitric acid may be recovered by direct condensation of $HNO_3$ in the decomposition step or in the BAN formation step, if used. Such recovery recycles about 67% of the nitric acid used in the process. However, substantial amounts of the acid exit the second and third decomposers in the form of $NO_X$ gases. According to a preferred embodiment of the present invention, the reconstitution of such $NO_X$ gases to nitric acid is most efficiently performed as follows:

$NO_X$ gases, produced by indirectly heated thermal decomposition of aluminum nitrate materials and consisting essentially of $NO_X$, $O_2$, and water vapor and possibly samll amounts of $N_2$ from air inleakage, are partially cooled, blended with sufficient air to provide 5–10% $O_2$ in the tail gas, and are absorbed in recirculating, cooled, 50 to 60% nitric acid solution from a common receiver tank in two or more packed absorption towers. Nitric acid gas is contacted in a first packed absorption tower operating around atmospheric pressure to 5–50 inches water column negative pressure in counter-current relationship to an amount of the said cooled nitric acid solution sufficient to keep the temperature of the acid solution leaving the said column at below about 180° F., the unabsorbed gases exiting said tower are compressed to within a range of about 20 to 100 psig, or even higher if desired, and contacted in a second, pressurized packed absorption column in counter-current relationship with a quantity of said cooled 50–60% nitric acid solution sufficient to maintain the temperature of the liquor leaving said column below about 150° F., preferably below about 130° F., and residual gases from the second tower are passed through a small absorber in counter-current relationship to a flow of a small amount of water to absorb excess HCl gases and then passed to suitable tail gas $NO_X$ recovery or destruction means before venting to the atmosphere.

The recovery of nitric acid solutions from nitrous gases produced by the catalytic combustion of ammonia in air is a well-known art that is practiced commercially around the world. The basic process comprises contacting the ammonia oxidation gases at a pressure of 3 to 6 atmospheres absolute, or even higher, in a bubble cap-tray absorption column containing of the order of a hundred trays in counter-current relationship with a supply of water introduced at the top of the column. Variations of the technology are concerned substantially with design of the bubble cap trays, oxidation of the ammonia under pressure, or oxidation at about atmospheric pressure to reduce catalyst consumption followed by the compression of the cool gases, the recovery and re-use of the heat produced in the ammonia oxidation reaction, and especially recently methods of reducing the approximately 1,000 ppm $NO_X$ concentration in the tail gas before releasing this gas to the atmosphere.

The chemistry of the conversion of $NO_X$ gases to nitric acid in solution is generally considered as consisting of 2 overall reactions which serve to define the mass balance between the liquid and vapor streams. Reaction 1: $3NO_2(g) + H_2O(l) = 2HNO_3(aq) + NO(g)$ which occurs principally in the liquid phase and reaction 2: $2NO(g) + O_2(g) = 2NO_2(g)$ which occurs substantially in the gas phase. The rate of reaction 1 is thought to depend primarily upon the rate of absorption of $NO_2$ into the liquid stream which depends upon the partial pressure of $NO_2$ in the gas stream and is thus slowed down by the presence of large quantities of inert gases such as $N_2$, and concentrations of NO in the gas phase which tend to drive reaction 1 in the reverse direction. Once the $NO_2$ has been absorbed the reactions in the liquid phase appear to proceed at satisfactory velocities. The rate of reaction 2 is proportional to the product of the square of the partial pressure of NO and the partial pressure of $O_2$ and can be quite slow in the presence of large amounts of inert gases such as $N_2$. In the ammonia oxidation process for making nitric acid the feed gases from the oxidizer comprise on the order of 70 volume percent $N_2$ and the proportion of $N_2$ increases as the $NO_X$ gases are absorbed from the gaseous stream. Additional $N_2$ is added to provide some oxygen in the tail gas to drive reaction 2 toward completion. Thus, although nitric acid has been recovered from ammonia oxidation gases at about atmospheric pressure using 2 or 3 absorption towers in series it has been found more economical to compress the gases to 3 to 6 atmospheres absolute so as to increase the partial pressure of the reacting gases sufficiently to permit carrying out the reconstitution in a single tall column. On the other hand $NO_X$ gases produced by the thermal decomposition of aluminum nitrate material in properly constructed, indirectly-heated decomposers contain little or no inert gases. A typical composition of such a gas, before any air in-leakage, is about 25 volume percent of ($NO_2 + NO$), about $12\frac{1}{2}$ volume percent $O_2$ and about $62\frac{1}{2}$ volume percent water vapor. Since in the absorption column water vapor is absorbed in the liquid stream much more rapidly than $NO_2$ the concentrations of the reacting gases increase during passage through the absorption column so that the same or even higher rates of Reactions 1 and 2 may be achieved at near atmospheric pressure as can be achieved with ammonia oxidation gases at elevated pressures.

Since both Reactions 1 and 2 are highly exothermic and the easily reversible Reaction 1 can begin converting $HNO_3$ from the acid solution to $NO_2$ in the gas at temperatures as low as 150° to 180° F., depending upon the concentration of $HNO_3$ in the liquid and of NO in the gas phase, the removal of heat from the absorption column is of major importance. It is known in the art to remove this heat either by placing water-cooled cooling coils in the liquid layer maintained on the upper side of the bubble cap trays or to withdraw a portion of the liquid from each of a number of trays in the column, pass the liquor through individual heat exchangers, and return it to the column after cooling. Plants handling ammonia oxidation gas typically provide sufficient cooling to the column by one or the other means so that the strong acid exiting the column is cooler than about 120° F., or even lower depending upon the strength of the nitric acid that is being manufactured.

In contrast to the recovery of nitric acid from ammonia oxidation gases there has been very little need around the world to recover nitric acid from concentrated $NO_X$ streams such as that described above for the decomposition of aluminum nitrate materials.

The $NO_X$ recovery process of the present invention comprises contacting $NO_X$ gases containing at most relatively small proportions of inert diluant gases such as $N_2$ in counter-current relation with a cooled 50–60% nitric acid solution in one or more packed columns operating at about or slightly below atmospheric pressure to remove as nitric acid the major portion, preferably 90% or more, of the originally-introduced $NO_X$ values, comprising the residual depleted gases to 2 to 6 or more atmospheres absolute and contacting the compressed gases in counter-current relation with the said nitric acid solution in a packed tower to strip substantially all of the remaining nitric acid values from the gas stream. The nitric acid solution is maintained at about the acid concentration required for extraction, i.e. within the range of about 50 to 60% acid, usually around 54 to 58%, and is supplied from one or more surge tanks, as may be desired, through heat exchangers to the individual packed columns at rates to each column such that the acid solution leaving the column is less than about 180° F. in temperature, preferably less than about 150° F. Liquid draining from the towers is collected in the said surge tank for recirculation and the excess is drawn off as product acid for use, for instance, for the digestion of alumina from calcined clay for the manufacture of more aluminum nitrate in a process for the recovery of metallurgical grade alumina from clay. More specifically, according to the preferred method, concentrated $NO_X$ gases from aluminum nitrate decomposers are mixed with hot make-up $NO_X$ gases from an $NH_3$-oxidizer, pass through a waste heat boiler, wherein re-usable heat is extracted, and then blended with vent gases, and with air introduced through a flow control valve that is responsive to an oxygen meter. The mixed gases pass into an open spray tower where they are counter-currently contacted with acid to remove a portion of the contained heat, water vapor, and $NO_2$ and then pass sequentially through one or more packed towers, in which they are counter-currently contacted with acid which has been cooled in a heat exchanger, and then compressed in a compressor to 2 to 6 or more atmospheres absolute pressure before passing through another packed tower in counter-current contact with cooled acid. The vapors are then passed through a bubble cap tower where they are contacted counter-currently with water to absorb HCl values that may be present and the remaining gases pass through an absorber for stripping out any residual $NO_X$ before exhausting to the atmosphere. Nitric acid solution draining from all of the towers is collected in a tank, in which the acid concentration is controlled to below 60%, or preferably below about 58%, by means of the addition of relatively strong acid from the aforesaid acid and heat recovery operations.

The reaction towers are packed absorption columns wherein the packing may be any desired commercially available packing material which preferably has a large void volume per unit of surface area such as is true of Raschig rings. The large void volume of, for instance, Raschig rings minimizes the velocity of flow of the gas through the packing, thereby providing gas residence time for the relatively slow Reaction 2 to proceed. This reaction time would have to be provided by increasing the height of the tower if packing with a lower void volume were provided. Such rings also simultaneously provide a large gas-liquid contact area which in well known manner facilitates the absorption of $NO_2$ into the liquid and desorption of the reaction product NO from the liquid.

Void volumes for a number of packing materials available are listed in "Chemical Engineers Handbook" Fifth Edition edited by Perry and Chilton-McGraw-Hill Publishing Company, New York, N.Y.; Section 18: Gas-Liquid Contacts. This section also discusses the relative efficiencies of various packing materials for absorption of gases into liquids and presents methods of estimating absorption rates, heat-transfer rates, pressure drops, etc. Data also may be obtained from packing manufacturers and from other well-known publishing sources.

As mentioned hereinabove, plate-type absorption columns generally are used for absorption of $NO_X$ from gases produced by oxidation of $NH_3$ with air to obtain the maximum possible void volume, and gas residence time, wherein Reaction 2 may proceed substantially to completion. For the concentrated gases addressed herein, however, an even more important requirement is the abstraction of sensible heat from the gas phase produced therein by the exothermic Reaction 2, whereby the temperature rise of the gas phase, with the attendant rapid decrease in the rate of Reaction 2, is minimized. Packed towers are much more efficient for the removal of this sensible heat than tray-type towers, and in addition evaporation of water and acid from the myriads of small droplets dispersed in the gas phase further assists in minimizing the gas temperature rise thereby permitting use of much smaller equipment than would be possible with tray-towers.

The following examples are intended to better describe and more clearly point out the advantages and preferred manipulative steps of each of the steps of the process of the instant invention.

EXAMPLES

CLAY PREPARATION

1–2

Figure 3:
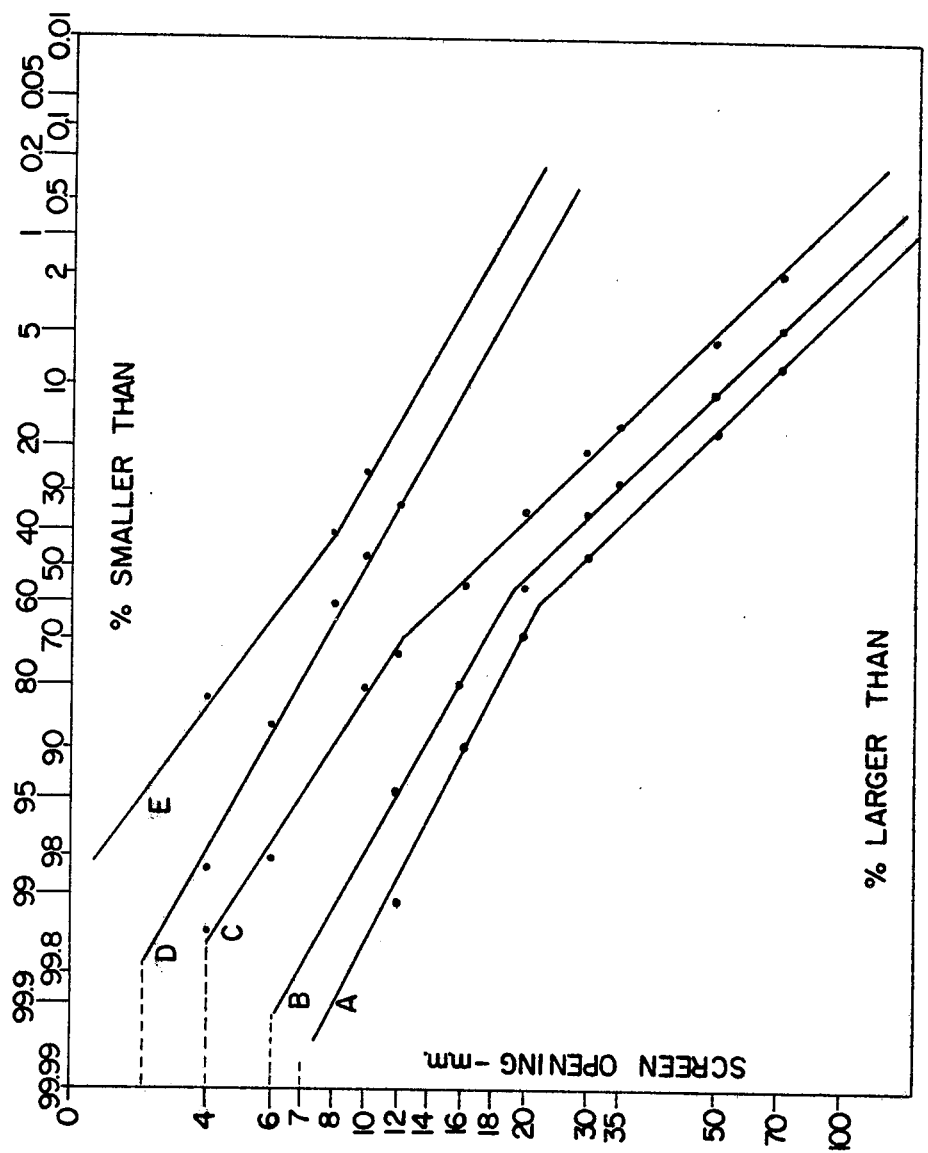
FIGS. 3 and 4 are graphs showing particle size distribution of pellets formed according to the pelletizing process described in the instant application and indicate generally the effect of screen size and moisture content on product size distribution.

These examples, for which particle size distribution data are presented in FIGS. 3 and 4, indicate generally the effect of screen size and moisture content on product size distribution. Materials for these tests are mulled in a laboratory-size mix-muller of standard design. The blended damp material is then passed through a 10½" diameter tornado mill, Model 44–0, manufactured by the Strokes Machine Company, using various screen sizes as indicated, and the resulting pellets rolled in a 55 gallon drum in which two 1½" wide by ¼" thick steel plates have been welded lengthwise to the side of the drum to serve as lifters. Referring to FIG. 3, the size distributions of the product from the use of each of 5 different size screens on the tornado mill are shown in curves A, B, C, D and E. Curve D, which is made with a 3 mesh screen with square openings of about 6.7 mm formed by 1.87 mm wire and with 20% moisture content in the clay, shows a particularly desirable size distribution. This is the average size distribution obtained while processing material containing 550 pounds of dry solids through the tornado mill and then rolling for 15 minutes. This material contains only a minor amount of +6 mm material, and only 5% of minus 1 mm material from which a satisfactory portion can be removed easily by passing over a 16 or 18 mesh screen. Curves A, B, C and E were obtained with 0.8 mm, 3.35 mm, 4.75 mm and 12.7 mm square-opening screens respectively, with about 21% moisture in the clay feed.

A Product D ground at about the optimum moisture content of 20% gives a substantially straight line distribution whereas products A, B, and C, ground at about 21% moisture, depart from the straight line relation in the direction of the formation of excessive amounts of very fine particles. It is thought that Product E, which is also ground at 21% moisture, indicates the beneficial affect of reducing the rotation rate of the knives in the tornado mill from a normal 3500 rpm to 2200 rpm. The increased production of fines with damper material is indicated also in curves F and G of FIG. 4 in which curve F is ground at 21% moisture through a half inch U.S. Seive series screen and Curve G, which exhibits a lower proportion of fines, is ground through the same screen at 19% moisture. Curve G is substantially parallel to Curve D. Products H and K indicate the influence of some diluants, Product H comprising 20% (dry weight basis) of calcined and ground clay and ground at 22% moisture, and Product K comprisig a mixture of sandy clay and nonsandy clay blended to provide 21%. sand (dry basis) and ground at 18% moisture. From the slopes of the curves compared to Curves D and G it is thought that both of these products contain slightly more water than the optimum.

EXAMPLE 3—Overall Process

Kaolin clay comprising about 18 to 19% free moisture, and with a nominal chemical composition on the dry basis as given in Table 1, is fed at a rate of about 150 tons per hour to a mix muller wherein it is blended with water to a composition of about 20% free moisture and is then treated in a hammer mill with a 360° screen comprising about 7 mm square openings whereby discrete pellets are produced with a size range of about 1% +5 mm and about 8% −1 mm. These particles are rolled in a rolling means for about 30 minutes in the presence of a draft of warm air whereby the particle surface is rounded and compacted, substantially without agglomeration, to produce relatively attrition-resistant rounded pellets with a size distribution of about 2% +5 mm and 5% −1 mm and with a free moisture content of about 18½%. The pellets are then dried, calcined and cooled in a series of three fluid beds arranged with backward recycle of the cooling air and calciner off-gases for maximum utilization of heat. The pellets are dried to a relatively low free moisture content in a first fluid bed operating at about 300° F. that is heated and fluidized primarily with off-gases from the calciner and then calcined at about 1500° F. in a second fluid bed using heat produced by the in-bed combustion of powdered coal with warm air from a third fluid bed means wherein about 106 tons of calcined pellets are cooled to about 300° F. by contact with ambient air passing through the fluidized bed. Off-gases from the dryer are treated in known manner to remove atmospheric contaminants before exhausting to the atmosphere.

EXTRACTION

About 106 tons per hour of the calcined clay pellets are extracted countercurrently for about 2 hours with about 819 gallons per minute of unbleached 55% nitric acid preferably from an acid recovery operation, which acid contains about 1% of dissolved $NO_X$, and the extracted pellets are washed countercurrently with about 617 gpm of wash water, to produce about 1200 gpm of product liquor comprising about 10¼% dissolved $Al_2O_3$, and about 52 tons (dry basis) digested and washed solids which solids carry adhering wash water (of about 50 tons) with a nitrate concentration of about 10 ppm. The extraction section of the countercurrent extractor comprises about 40 feet of effective bed height and the washing section comprises about 40 feet of effective bed height. Vapors, about 43 tons/hr. of about 8% $HNO_3$, produced in the extraction section by virtue of the heat liberated by dissolving alumina in nitric acid are condensed in a heat recovery means and about 170 gpm of about 8% nitric acid condensate is condensed and blended in with the aforesaid 55% acid stream in a mixer. Wash liquor from the washing section is blended with the aforesaid mixture of strong acid and condensate at the point of introduction to the digestion section to form a nitric acid solution of about 37% by weight nitric acid which is then passed in counter-current mode through the aforesaid about 40 feet thickness of pellet bed. A portion of the recovered heat from condensation of the vapors is used to warm the incoming 55% acid to insure the 37% leach acid is near its atmospheric-pressure boiling point as it is introduced to the digestion section. Approximate analyses of the spent, washed solids and of the product liquor stream are given in Tables 2 and 3, respectively.

IRON-SILICA REMOVAL

The digestor product liquor, which on a time-average basis comprises about 1000 ppm suspended solids, about 3000 ppm dissolved $Fe_2O_3$, and about 150 ppm dissolved $SiO_2$, and contains about 5% less nitrate values than are required to make stoichiometric aluminum nitrate with the contained alumina, is blended in a first stirred reactor for about 2 hours mean residence time with about 206 gpm of underflow slurry of about 15 weight % solids concentration whereby the total slurry entering the first reactor has about 1 weight % suspended solids and whereby a suspended solids level in the reactor of above about 1% by weight is maintained. Overflow from the first stirred reactor is passed to a second stirred reactor of about 1 hour retention time from which the overflow is passed to a third stirred reactor of about 1 hour retention time whereby the liquor containing dissolved iron is maintained in contact with at least about 1% by weight suspended solids, comprising previously precipitated iron oxide and silica values, for an effective time of about 4 hours during which the dissolved iron crystallizes from solution on to the surface of the suspended solids in the form of hematite, to a residual level in solution of about 0.025 weight %. Overflow from the third stirred reactor is passed through a static blender wherein it is blended with about 4 pounds per hour of Super-Floc 16 introduced as a 0.1% solution and thence to settling means wherein the solids are allowed to settle to an underflow stream of about 15% solids and a supernate comprising about 150 ppm suspended solids. A portion of the underflow slurry containing about 1.63 tons of solids is passed through a centrifuge wherein the suspended solids are separated and washed and discarded to waste. The remainder of the underflow slurry, along with the liquor and wash liquor from the centrifuge, are passed to the first reactor to maintain the aforesaid about 1% suspended solids level entering the first reactor.

The supernate liquor is blended in a static mixer with about 0.26 pounds per hour of Super-Floc 16 in about a 0.1 weight % water solution and is passed to a sand bed filter comprising an about 20-inch deep bed of the digested and washed solids from digestion and suitable support means therefore. The liquor containing the Super-Floc 16 is passed through the layer of washed digested solids whereby the silicious material in the liquor is reduced to about 30 ppm. A portion of the treated liquor is maintained in a side vessel for use in backwashing the filter and the remainder is passed through suitable conveyance means to crystallization purification means for the preparation of purified aluminum nonahydrate (ANN). All of the aforesaid equipment is covered to prevent the escape of fumes and is thoroughly insulated to reduce the loss of heat from the system. With adequate insulation the temperature of the liquor passing to crystallization is on the order of about 115° C.

CRYSTALLIZATION

The aforesaid about 1200 gpm of liquor which has been reduced in iron and silica content and has approximately tne analysis shown in Table 4 is treated in a series of 3 ANN crystallization units, each comprising a heated melter means, an evaporative crystallizer which includes means for condensing the evaporate and means for supplying heat to the crystallizer, and centrifuge means wherein crystals of ANN are separated from the mother liquor and washed. Washed and purified ANN crystals obtained from the first crystallization unit are passed to decomposition means and a mother liquor purge stream from the third ANN unit, containing the bulk of the impurities present in the said feed liquor, is passed to a purge-stream decomposition means. ANN crystals obtained in the third unit are washed with mother liquor purged from the second unit, which wash liquor then forms the liquid feed to the third unit. The crystals are then passed to the melter of the second unit. ANN crystals obtained in the second unit are washed with mother liquor from the first unit and then passed to the melter means of the first unit. Mother liquor purged from the first unit, including that used to wash the crystals produced in the second unit, is mixed with the crystals from the third unit in the second unit melter means and dissolved by the application of heat to produce feed to the second unit. Crystals from the first unit are washed with water and passed to decomposition and the wash liquor and the feed to crystallization is heated together with crystals from the second unit to produce the feed to the first unit crystallizer. Vapors from each of the evaporative crystallizer means in each of the units are condensed on the shell side of horizontally-disposed tube and shell condensers, each provided internally with at least one liquid-separation baffle and with at least two liquor drains, one upstream and one downstream of the baffle, whereby the first condensate portions, which have a nitric acid concentration of the order of 3%, are collected separately and stored in a separate storage tank and the remaining about 4/5 of the total condensates, which have a concentration of less than about 0.05% nitric acid are collected and maintained separately. Each of the condensers is connected on the vapor side to a vacuum generator through a bleed line sized to provide for removal of non-condensable gases in the vapor stream, as for instance air, and the pressure in the condenser and evaporative crystallizing system, and therefore the crystallizer temperature, is allowed to vary in accordance with the temperature of the cooling water from the cooling towers which is somewhat cooler in winter than in summer.

About 409 tons per hour of liquor from the aforedescribed sand bed filter is blended with about 454 tons of ANN crystals produced in the second crystallization unit, about 59 tons of wash liquor fron the first unit washing centrifuge which comprises about 9.9% alumina at about 102° F., about 20 tons of 3% acid condensate, and about 10 tons of 55% acid from acid recovery, and is warmed to about 150° F. to produce about 950 tons per hour of first unit crystallizer feed comprising about 11.6%. alumina and containing just slightly less than the stoichiometric amount of nitrate values to form normal aluminum nitrate. Under these specific conditions the heat available in the crystallizer feed stream, plus the exothermic heat produced by the crystallization from solution of about 335 tons of ANN crystals, is just about sufficient to supply the heat needed for the evaporation of about 39.7 tons of vapor comprising about 0.5% $HNO_3$ which is condensed in the condenser under a total pressure of about 71 mm mercury absolute. By means of the aforesaid baffle in the condensate collection area of the condenser, the condensate is recovered as a first portion of about 7 tons 3% nitric acid concentration and a second portion of about 33 tons of less than about 0.05% $HNO_3$. The two condensate streams are collected in separate storage tanks for reuse within the overall process. At this particular moment in time the evaporative crystallizer is operating at about 140° F. As the temperature of available cooling water changes the temperature of the crystallizer is allowed to seek its natural level within the range of about 125° to 140° F.

Crystal magma containing about 335 tons per hour of ANN crystals is passed to the de-liquoring section of the centrifuge wherein the mother liquor is slung free. About 556 tons per hour of this mother liquor are purged to the second unit and the remainder is recycled to the crystallizer. The 335 tons of ANN crystals, with adhering mother liquor, are passed to the two-stage washing section of the centrifuge wherein they are washed with about 17.4 tons per hour of water, divided equally between the two washing stages, whereby most of the mother liquor adhering to the crystals entering the centrifuge washing section is washed away and a portion of the crystals are dissolved to produce a wash liquor stream of about 59 tons, that is saturated with aluminum nitrate at about 102° F. The wash liquor is conveyed to the first unit melter, and a purified crystal stream of about 310 tons which has the approximate analysis given in Table 5 is passed to decomposition.

A portion, about 90 tons, of the 556 tons of mother liquor purged from unit 1 is passed through the washing section of the centrifuge means of unit 2 and the wash liquid and the remainder of the mother liquor is blended in the unit 2 melter means with about 83 tons of washed crystals from unit 3 and about a half ton of 55% nitric acid and warmed to about 150° F., whereby a unit 2 evaporative crystallizer feed liquor of about 640 tons per hour, comprising about 11.5% $Al_2O_3$ and a nitrate content just less than the stoichiometric amount required to form aluminium nitrate with the alumina contained therein, is prepared. This feed liquor is pumped to the evaporative crystallizer of unit 2 wherein additional heat is supplied as needed and evaporation and crystallization proceeds to produce a vapor stream of about 75 tons per hour containing about 0.5% nitric acid, which is condensed in the condenser and recovered as above described for unit 1 as about 13 tons of 3% nitric acid and about 62 tons of 0.05% nitric acid, and about 433 tons of ANN crystals in magma which are centrifuged and washed with the aforesaid purge from unit 1. The washed crystals with adhering wash liquor are then returned to the melter of unit 1. Simultaneously, about 111 tons of mother liquor purge are passed to unit 3, wherein various components are operated as described for unit 2, to produce about 17 tons of nitric acid vapor, about 83 tons of washed crystals which are recycled to the melter means of unit 2, and a mother liquor purge stream of about 11 tons per hour which comprises about 1 ton per hour of alumina and the bulk of the trace element impurities originally extracted from the clay and which has substantially the analysis given in Table 6.

The ANN product (Table 5) of this process is considered to be sufficiently pure to meet the requirements of metallurgical-grade alumina. It is within the skill of the art, however, if additional purity with respect to $P_2O_5$, $K_2O$, and the like is desired, to introduce the ANN product of unit 1 to an ANN crystallization unit 4, substantially identical in construction and operation to the units previously described, and recover therefrom a washed ANN product of enhanced purity.

ANN DECOMPOSITION AND HEAT RECOVERY

The about 310.5 tons of washed purified ANN products from crystallization unit 1 is melted at about 230° F. by heat supplied from condensing about 51% nitric acid vapors at about 10 psig in a heat exchanger. The molten ANN is pumped into the tubes of a long-tube evaporator, heated on the shell side with about 200 psig condensing steam, wherein the liquor en passage partially evaporates, thereby forming about 102 tons of 51% nitric acid vapor at about 10 psig pressure which is condensed at about 260° f. in heat recovery means, wherein about 143 million btu heat of condensation is recovered for re-use within the process; and a liquor stream of about 208 tons comprising about 20% alumina at about 310° F. which, under the autogenous pressure of the system, is pushed through spray nozzles whereby it is sprayed into a fluidized bed of partially decomposed alumina particles. The bed is maintained at about 375° F. by indirectly-supplied heat from the condensation of about 300 psig steam and is maintained in a fluidized condition by the passage therethrough of nitric acid and water vapors of about 55 weight % nitric acid concentration which are recirculated from the off-gases of the fluid bed by the pumping action of a suitable compressor.

The particles of molten aluminum nitrate spray produced by action of the spray nozzle means are deposited in thin layers on the partially-decomposed alumina particles in the fluid bed and decompose to produce about 93 tons per hour of about 55% nitric acid vapor which is condensed at atmospheric pressure and about 239° F. in a heat recovery means wherein about 130 million btu per hour heat-of-condensation heat is recovered and recycled to the process.

The partially decomposed alumina pellets, comprising about 36.2% alumina and 44.5% $HNO_3$, are removed at their net production rate of about 115 tph and conveyed to the upper fluidized bed of an over and under, 2-unit, fluidized bed arrangement in which the upper bed is maintained at about 750° F. by indirect heat transfer from a flowing stream of NaK which circulates through the bed and through an external heating means heated by combustion of coal. The lower bed is maintained at a bed temperature of about 1300° F. in the same manner. The upper fluidized bed is maintained in the fluidized condition by the passage therethrough of off-gases from the lower fluidized bed whch in turn is maintained in the fluidized condition by the passage therethrough of gases recirculated, through pressurizing and conveyance means, from the off-gases of the upper bed. The partially decomposed pellets entering the upper fluid bed are further decomposed by the action of heat supplied thereto to around 8% nitrate content and are passed to the lower bed wherein they are further decomposed by the action of heat supplied at the higher temperature of about 1300° F. to pellets comprising about 97% alumina and about 0.1% nitrate. The pellets are then passed through suitable conveyance means to a third fluid bed wherein they are calcined at about 2100° F. by heat supplied from the burning of fuel oil with fluidizing air within the fluidized bed. The overflow from the calcining fluidized bed is recovered at a rate of about 42 tph of calcined alumina that is suitable for feeding to an alumina reduction cell. Off-gases from the calciner means are passed to heat recovery and clean up means.

ACID RECONSTITUTION

Off-gases from the aforesaid over and under fluid bed decomposer, which gases consist esentially of $NO_X$, oxygen, and water vapor upwards of about 52 volume %, are passed to the acid reconstitution area wherein they are blended with similar $NO_X$ gases from a purge decomposition unit to be described subsequently, and with about 2 tons per hour of make-up nitric acid values supplied as $NO_X$ formed by the oxidation of ammonia in an atmospheric-pressure ammonia oxidation means, and are cooled in a heat recovery means whereby a portion of the sensible heat content of the relatively hot gases is recovered for re-use in the process. The relatively cool gases are blended with about 2000 S.C.F.M. of ambient air and are passed through scrubbing and absorption means whereby the contained $NO_X$ values are absorbed in recirculating nitric acid solution and are recovered as about 55 to 56% nitric acid solution comprising about 1% dissolved $NO_X$ which is recycled to the process at a rate of about 850 gpm. Cool liquid acid streams from the aforedescribed heat-of-condensation recovery means, as aforesaid about 102 tons of about 51% nitric acid and about 93 tons of about 55% nitric acid, are pumped to a liquid-acid accumulation and storage area in the acid reconstitution area along with a small amount, as needed, of the aforementioned 3% acid condensate as is necessary to maintain the acid in the said accumulator means as an about 55 to 56% $HNO_3$ solution.

The accumulator tank also receives directly the warm effluent liquor streams from the $NO_X$ gas scrubber and from the $NO_X$ absorption towers and the scrubbing liquid and absorbing liquid is recirculated to the top of these units from the accumulator tank through suitable heat exchangers whereby about 100° F. cool solution is supplied to the respective units, and the heat generated by the reconstitution of $NO_X$ to nitric acid is transferred to flows of cooling water and in turn exhausted to the atmosphere in a cooling tower.

The mixed and cooled gas is fed to the bottom of an open tower scrubber consisting essentially of a tank about 16 ft. diameter and about 20 ft high, fed at the top by a sprayer with about 4000 gpm of cooled acid from the accumulator tank at about 100° F. The spray falls through the rising gases and drains from the bottom of the tank back to the accumulator tank at about 150° F. and the treated gases, now substantially reduced in water content and NO content, are passed to an absorption column of about 13 ft. inside diameter packed with 2" Rachig rings for a total depth of about 35 feet. In the tower, the gases rising through the packing are contacted counter-currently with a flow of acid from the accumulator tank at a rate of about 4,000 gallons per minute cooled to about 100° F. During passage the acid absorbs about 90% of the feed $NO_X$ as nitric acid and drains back to the said accumulator tank at a temperature of about 150° F.

Gases issuing from the top of the absorption column are compressed to about 6 atmospheres absolute pressure and are fed to the base of a second absorption column, operating at about 6 atmospheres pressure. This column comprises about a 4 ft. inside diameter column packed with 2" Rachig rings to an overall packing depth of about 30 feet. In the column, the gases are contacted counter-currently with a liquor flow of about 180 gpm of acid from the accumulator tank, at a temperature of about 100° F. The acid absorbs $NO_X$ as it drains through the packing of the column and then drains back to the accumulator tank through control means which serve to prevent the loss of pressure from the column. Treated gases from the top of the column comprise about 2½ pound moles of $NO_X$, about 0.3 pound moles of $HNO_3$, about 8.4% $O_2$ by volume and have a total volume of about 4700 S.C.F.M.

These gases contain a small amount of HCl values, introduced into the processing system mainly through the water supply and to a lesser extent from chlorides contained in the clay. Such HCl values enter the reconstitution portion of the process mainly in the gaseous effluent from the purge stream decomposers. Therefore, these gases are further absorbed in countercurrent relation to a flow of about 200 pounds per hour of water in an absorption column about 3 ft. in diameter by 6 ft. high containing about 6 bubble cap absorption trays. The effluent HCl-containing absorber liquor, which may contain up to about 25% $HNO_3$, is treated in an ozonation means whereby HCl content is converted to $Cl_2$ gas which in turn is absorbed in caustic solution for disposal. Residual nitric acid solution is conveyed to the accumulator tank. The absorber off-gases, depleted in HCl content, are then passed through a bed of molecular sieve absorbent wherein the contained $NO_x$ is converted to $NO_2$ and absorbed by the molecular sieve, and the effluent gases, comprising about 10 ppm $NO_x$, are exhausted to the atmosphere. Periodically, the absorbed $NO_2$ is desorbed from the said molecular sieve absorbent and recycled to the aforesaid $NO_x$ stream entering the open tower scrubber.

PURGE STREAM DECOMPOSITION

The aforesaid about 11 tons per hour mother liquor purge stream from crystallizer unit 3, comprising substantially the bulk of the acid-soluble trace-element impurities extracted from the calcined clay that were not previously removed in the iron and silica removal means, along with some alumina values, is sprayed into the fluidized bed of a fluid bed decomposer wherein the bed temperature is maintained at about 375° F. by indirect heat transfer to the bed of heat released by the condensation of about 200 psig steam and wherein the fluidization of the bed is maintained by the passage therethrough of off-gases from the bed which off-gases have been recirculated through a compressor to the bottom of the bed and wherein the said spray particles form thin-layer coatings on the surface of the particles of said bed, causing them to grow. Such thin layers decompose to $HNO_3$ and water by action of the heat supplied to the bed. Gases in excess of those required to maintain fluidization of the bed are treated and condensed in a heat recovery means to liquid nitric acid solution, which is conveyed to the accumulator tank, and the heat of condensation recovered therefrom is recycled to the process. Particles accumulating in the bed by virtue of the feed thereto are conveyed to a second fluid bed wherein the temperature is maintained at about 750° F. by the indirect transfer of heat to the bed from a flowing NaK stream which is heated by external coal firing, and are further decomposed to produce (1) a vapor stream which is conveyed to the $NO_x$ gas feed to the acid reconstitution means, and (2) a solids stream of alumina and trace element impurities of about 2 tons per hour, which further comprises economically useful nitrogen, phosphorous, and potash values and other mineral elements which are essential to the growing of agricultural crops.

EXAMPLE 4

This example illustrates the incorporation into the process described in Example 3 of the preparation of large-crystal basic aluminum nitrate with the simultaneous recovery of heat of condensation of the vapors produced therein. Because of the purification with respect to phosphorous achieved during the preparation of the large crystal BAN and because of the recycle of wash liquors therefrom some modification of stream flow rates, but not of the equipment layout, of the aforedescribed three ANN crystallization units is needed. According to this modification, the amount and composition (Table 4) of the feed liquor from the silica removal operation and the amount and composition (Table 6) of the mother liquor purge from the ANN crystallization unit three are essentially unchanged.

The about 1200 gpm of product liquor from silica removal is blended in the first crystallization unit melter with about 85 tons of wash liquor from the BAN unit washing centrifuge, about 78 tons of wash liquor from the first ANN unit washing centrifuge, about 40 tons of 55% acid, and about 400 tons of ANN crystals recycled from the ANN unit 2 washing centrifuge, and is heated to about 152° F. to produce about 1010 tons per hour of feed liquor that is conveyed to the unit 1 crystallizer wherein it is evaporated and crystallization proceeds to produce a vapor stream of about 56 tons per hour, about 442 tons of ANN crystals and about 488 tons of mother liquor per hour separated on a centrifuge. The mother liquor is purged to unit 2, and the 442 tons of ANN crystals, with adhering mother liquor, are washed with about 23 tons per hour of water whereby a washed crystal product stream of about 409 tons per hour, which assays approximately as shown in Table 8, is obtained and conveyed to the BAN crystallization unit melter, and about 78 tons per hour of wash liquor is obtained and recycled to the aforesaid Unit 1 melter.

The about 488 tons of Unit 1 mother liquor purge is conveyed to the ANN Unit 2 melter wherein it is blended with about 113 tons of washed ANN crystals from Unit 3 and about one half ton 55% nitric acid and warmed to about 152° F. to produce about 602 tons per hour of feed to the ANN Unit 2 crystallizer wherein about 58 tons of about 0.5% $HNO_3$ vapor is distilled off and condensed in a condenser. The resulting crystal magma is separated and washed in the centrifuge whereby about 400 tons of crystals washed with mother liquor purged from Unit 1 are recovered and returned to the melter of Unit 1 and about 146 tons of Unit 2 mother liquor are recovered as purge and sent to ANN Unit 3.

The about 146 tons of mother liquor purged from Unit 2 is blended with about a half ton of 55% nitric acid in the Unit 3 melter and is then treated in the ANN Unit 3 crystallizer by the application of heat to produce a vapor stream of about 23 tons per hour of half percent nitric acid which is condensed in the Unit 3 condensor, and a crystal magma which is centrifuged and washed with a portion of the purge mother liquor from Unit 2 to produce about 113 tons per hour of washed crystals that are transported to the melter of ANN Unit 2. About 11 tons of Unit 3 mother liquor is conveyed to the purge liquor decomposition section and treated as in Example 3.

BAN CRYSTALLIZATION

The about 409 tons of water-washed ANN crystals from Unit 1 are blended in a melter with about 368 tons of BAN crystallizer mother liquor and heated to about 230° F. to produce about 777 tons of liquor, comprising about 14.2% alumina, 49.7% $HNO_3$. This liquor is fed into the tubes of a long-tube evaporator heated indirectly by heat from the condensation of about 200 psig steam. The liquor is heated and evaporated and exits from the tube to a liquid-vapor separator wherein it is split into about 227 tons per hour of about 52% $HNO_3$ vapor at about 10 psig and 315° F. which is condensed in a heat recovery means, and about 551 tons of liquor, comprising about 20% alumina, 49% HNO₃. The vapor is condensed in a heat recovery means at about 260° F. and recovered heat amounting to about 317 million BTU is recycled to the process.

The about 551 tons per hour of liquor, about 1360 gpm, is flowed through a plug flow conditioner, sized to provide a plug flow passage time of about 90 minutes. The liquor then flows under the head of gravity and the aforesaid about 10 psig pressure in the vapor-liquid separating means, into a plug flow crystallizer wherein it is mixed with about 19.5 tons per hour of water whereby the crystallization of large-crystal BAN is effected, and the crystal-mother liquor magma is drained through the plug flow crystallizer with a plug flow residence time of about 20 minutes to a centrifuge. The centrifuge comprises a deliquoring section from which about 368 tons of mother liquor is recovered and conveyed to the aforesaid melter for blending with ANN crystals; and a washing section in which about 202 tons of crystals are washed with about 20 tons per hour of water, containing about 3% HNO₃, divided equally between two washing stages, whereby the adhering mother liquid is washed away and about 10% of the BAN crystals are dissolved, to produce a wash liquor purge of about 85 tons per hour which is recycled as aforesaid to the Unit 1 ANN crystallizer melter and a crystal product of about 136 tons per hour which assays substantially as recorded in Table 9. The BAN crystal product stream is conveyed and introduced by suitable means to the upper bed of the aforedescribed over and under fluid bed decomposition means and is decomposed at successive bed temperatures of about 750° F. and 1300° F. Decomposer offgases and solid product are treated as in Example 3.

than required by stoichiometry to form aluminum nitrate;

(iv) purifying the basic aluminum nitrate product of step (iii) by
  (a) precipitating iron oxide by holding the product of step (iii) for a period of at least about 2 hours and at a temperature of between about 80 and about 120° C. in the presence of a small amount (about 1 to about 3%) of iron oxide seed material; and
  (b) filtering the liquor derived from step (iv)(a) to remove silicaceous impurities;

(v) crystalizing aluminum nitrate nonahydrate from the product of step (iv)(b);

(vi) converting the crystalized aluminum nonahydrate produced from step (v) to an infusible basic aluminum nitrate in an at least two-step process comprising:
  (a) evaporating nitric acid from the crystals in molten form to provide a solution of basic aluminum nitrate containing at least about 16.5 by weight alumina and recovering of the heat of condensation of the vapors thus produced;
  (b) decomposing of the basic aluminum nitrate liquor to infusible basic aluminum nitrate solids;

(vii) further decomposing the infusible basic aluminum nitrate solids in one or two stages at a temperature of between about 600° and 1300° F. for a period of from about 2 to about 7 hours;

(viii) calcining the residual metallurgical grade alumina at a temperature of between about 1900° and 2200° F., and (ix) reconstituting to nitric acid the NO$_X$ gases from step (xii).

2. The process of claim 1 wherein said pelletizing is accomplished by feeding clay comprising about 17 to

TABLE NO.

| | 1<br>Clay | 2<br>Leached Clay | 3<br>Digest Liquor | 4<br>ANN Feed | 5<br>ANN Ex. 1 | 6<br>ANN Purge Liq. | 7<br>Al₂O₃ Ex. 1 | 8<br>ANN Ex. 2 | 9<br>BAN Prod. | 10<br>Al₂O₃ Ex. 2 |
|---|---|---|---|---|---|---|---|---|---|---|
| Al₂O₃ | 36.8 | 2.6 | 10.5 | 10.5 | 13.42 | 9.5 | 99.97 | 13.42 | 30.6 | 99.97 |
| HNO₃ | — | — | 37.0 | 37.0 | 49.74 | 35.0 | — | 49.74 | 38.0 | — |
| SiO₂ | 45.6 | 93.0 | 0.015 | 0.003 | 0.0036 | 0.008 | 0.027 | 0.0028 | 0.0083 | 0.027 |
| Fe₂O₃ | 1.95 | 1.9 | 0.3 | 0.025 | 0.0012 | 0.97 | 0.009 | 0.0023 | 0.0048 | 0.016 |
| K₂O | 0.23 | 0.16 | 0.045 | 0.045 | 0.00015 | 1.66 | 0.0011 | 0.0002 | 0.00004 | 0.0001 |
| P₂O₅ | 0.077 | 0.046 | 0.015 | 0.016 | 0.00033 | 0.60 | 0.0025 | 0.0004 | 0.00004 | 0.0001 |
| CaO | .11 | 0.003 | 0.032 | 0.032 | 0.00024 | 1.17 | 0.0018 | 0.0003 | 0.00003 | 0.0001 |
| MgO | .07 | 0.03 | 0.016 | 0.016 | 0.00015 | 0.58 | 0.0011 | 0.0002 | 0.00003 | 0.0001 |

We claim:

1. A process for the extraction of alumina values from clay using nitric acid comprising the steps of:
  (i) pelletizing the clay into generally spherical particles having a diameter of between about 1 and about 8 mm and a free moisture content of between about 17 and 22%;
  (ii) calcining the pellets formed in step 1 at a temperature of between about 1100° and 1550° F. in a fluidized bed reactor;
  (iii) extracting the calcined clay pellets obtained in step (ii) in about 30 to about 40% nitric acid for a period of between about 1 and about 4 hours at about atmospheric pressure and a temperature of between about 220° and about 270° F. to produce basic aluminum nitrate product solution comprising between about 8 and 13 weight percent alumina and between about 5 and about 20% less nitric acid 22% free moisture through a hammer mill comprising rotating knives on a vertical shaft surrounded by a 360° screen having an aperture size of between about 2 and about 8 mm.

3. The process of claim 1 including the additional step of treating the pellets in a rolling drum for a period of between about 5 and about 30 minutes under substantially non-agglomerating conditions whereby the pellets are surface hardened.

4. The process of claim 1 wherein the extraction of step (iii) is performed in a continuous extractor.

5. The process of claim 4 wherein said continuous extractor comprises a vertical extraction tower, feeder means for introduction of calcined clay pellets at the top of said tower, discharge means at the base of said tower for removal of said pellets at a rate substantially identical to that of introduction, means for introducing wash water into said tower above said discharge means, means located intermediate said water introduction means and said feeder means for the introduction of nitric acid and venting means intermediate said nitric acid introduction means and said feeder means, said venting means serving to provide a means for escape of vapors generated by the heat of reaction upon contact of the acid with the clay pellets.

6. The process of claim 1 (step IV b) wherein the liquor from step (IV) (a) is filtered through a sand bed filter means at a temperature of between about 80 and about 125° C. in the presence of a suitable flocculant.

7. The process of claim 6 wherein the flocculant is selected from the group of polyacrylamide-based flocculants and is supplied at a rate of about 0.0004 to 0.004 pounds per ton of liquor undergoing desilication.

8. The process of claim 1 wherein the decomposition of the basic aluminum nitrate liquor to infusible basic aluminum nitrate solids is carried out by decomposing the product of step VI-a in a fluidized bed decomposer to a temperature of between about 300° and about 400° F. and recovering the heat of condensation of the resultant vapors for beneficial reuse.

9. The process of claim 1 wherein the decomposition of the basic aluminum nitrate product of step VI-a to infusible basic aluminum nitrate solids is carried out by the process comprising the steps of:
  (a) holding the liquid product of step IV-a in a quiescent state for a period of between about 20 minutes and about two hours at a temperature of between about 270° F. and about 350° F.
  (b) injecting water into the product of step (a) in an amount sufficient to adjust the composition of the conditioned liquor to a composition expressible as the sum of two components
    (1) aluminum nitrate nonahydrate, and
    (2) the desired crystal product of hydrated basic aluminum nitrate; and
  (c) separating the large crystals of infusible basic aluminum nitrate.

10. The process of claim 1 wherein said decomposition of step (vii) is performed in a two step process comprising:
  c(1) decomposing the product of step (vi)(b) by treatment at a temperature within the range of from about 600° to about 750° F. for a period of time sufficient to reduce the residual nitrate concentration in the solid product to from about 5 to about 10 weight percent $NO_3$; and
  c(2) decomposing the product of step (vi)(c)(1) by heating at a temperature in the range of from about 1000° F. to about 1300° F. for a period of time sufficient to reduce the residual nitrate concentration in the solid product to less than about 2 weight percent.

11. The method of claim 1 wherein the reconstitution of step (ix) is performed by a process comprising the steps of:
  (a) blending the $NO_X$ gases generated in the decomposition of step (vi) with sufficient air to provide at least about 5 volume percent $O_2$ in the gas mixture remaining after step (b);
  (b) absorbing the resulting gas mixture in from about 50 to about 60 weight percent nitric acid cooled to below about 180° F.

12. The method of claim 11 wherein the absorption of step (ix)(b) is performed in a multistage process comprising:
  b(1) absorbing the gas mixture in nitric acid in a packed absorption tower operating at between about atmospheric pressure and about 50 inches of water negative pressure;
  b(2) compressing unabsorbed gas to about 20 psig; and
  b(3) absorbing the compressed gas mixture in nitric acid at a temperature below about 150° F.

* * * * *